United States Patent
Bergman et al.

(10) Patent No.: US 10,928,087 B2
(45) Date of Patent: *Feb. 23, 2021

(54) METHOD OF ASSOCIATING AN HVAC CONTROLLER WITH AN EXTERNAL WEB SERVICE

(71) Applicant: Ademco Inc., Golden Valley, MN (US)

(72) Inventors: Gabriel A. Bergman, New Brighton, MN (US); Adam Nemcek, Ostrava (CZ)

(73) Assignee: Ademco Inc., Golden Valley, MN (US)

( * ) Notice: Subject to any disclaimer, the term of this patent is extended or adjusted under 35 U.S.C. 154(b) by 513 days.

This patent is subject to a terminal disclaimer.

(21) Appl. No.: 15/434,863

(22) Filed: Feb. 16, 2017

(65) Prior Publication Data

US 2017/0159954 A1    Jun. 8, 2017

Related U.S. Application Data

(63) Continuation of application No. 13/559,470, filed on Jul. 26, 2012, now Pat. No. 9,594,384.

(51) Int. Cl.
*G06F 15/16* (2006.01)
*F24F 11/62* (2018.01)
(Continued)

(52) U.S. Cl.
CPC ............. *F24F 11/62* (2018.01); *F24F 11/30* (2018.01); *G05B 19/042* (2013.01); *G05D 23/19* (2013.01); *G05D 23/1905* (2013.01); *H04L 12/282* (2013.01); *H04L 12/2809* (2013.01); *H04L 12/2827* (2013.01); *H04L 12/4625* (2013.01); *H04L 29/06* (2013.01);
(Continued)

(58) Field of Classification Search
CPC ............. H04L 29/06; H04L 29/08072; H04L 12/4625; H04L 67/10; H04L 67/125; G06F 3/0488
USPC ................................ 709/220, 224, 226, 228
See application file for complete search history.

(56) References Cited

U.S. PATENT DOCUMENTS

| 2,010,237 A | 8/1935 | Joseph |
| 4,079,366 A | 3/1978 | Wong |

(Continued)

FOREIGN PATENT DOCUMENTS

| DE | 3334117 A1 | 4/1985 |
| EP | 0070414 A1 | 1/1983 |

(Continued)

OTHER PUBLICATIONS

Totaline, "Instructions P/N P474-1010", Manual, 2 pages, Dec. 1998.

(Continued)

*Primary Examiner* — Khanh Q Dinh
(74) *Attorney, Agent, or Firm* — Shumaker & Sieffert, P.A.

(57) ABSTRACT

A wireless thermostat may be associated with a user account of an external web service that may facilitate remote access and/or control of the wireless thermostat. A remote device may be used to access a user's account hosted by the external web service. The wireless thermostat may be identified to the external web service and associated with the user's account by one or more unique identifiers previously delivered to the remote device from the wireless thermostat.

17 Claims, 9 Drawing Sheets

(51) Int. Cl.

| | | |
|---|---|---|
| *G05D 23/19* | (2006.01) | |
| *H04L 29/08* | (2006.01) | |
| *H04L 29/06* | (2006.01) | |
| *F24F 11/30* | (2018.01) | |
| *H04L 12/28* | (2006.01) | |
| *H04L 12/46* | (2006.01) | |
| *G05B 19/042* | (2006.01) | |
| *F24F 11/58* | (2018.01) | |
| *F24F 120/10* | (2018.01) | |
| *F24F 11/65* | (2018.01) | |
| *G06F 3/0488* | (2013.01) | |
| *F24F 110/10* | (2018.01) | |

(52) U.S. Cl.
CPC ...... *H04L 29/08072* (2013.01); *H04L 69/329* (2013.01); *F24F 11/58* (2018.01); *F24F 11/65* (2018.01); *F24F 2110/10* (2018.01); *F24F 2120/10* (2018.01); *G05B 2219/2614* (2013.01); *G06F 3/0488* (2013.01)

(56) References Cited

U.S. PATENT DOCUMENTS

| | | | |
|---|---|---|---|
| 4,174,807 A | 11/1979 | Smith et al. | |
| 4,206,872 A | 6/1980 | Levine | |
| 4,224,615 A | 9/1980 | Penz | |
| 4,264,034 A | 4/1981 | Hyltin et al. | |
| 4,296,334 A | 10/1981 | Wong | |
| 4,298,946 A | 11/1981 | Hartsell et al. | |
| 4,308,991 A | 1/1982 | Peinetti et al. | |
| 4,332,352 A | 6/1982 | Jaeger | |
| 4,337,822 A | 7/1982 | Hyltin et al. | |
| 4,337,893 A | 7/1982 | Flanders et al. | |
| 4,373,664 A | 2/1983 | Barker et al. | |
| 4,379,483 A | 4/1983 | Farley | |
| 4,382,544 A | 5/1983 | Stewart | |
| 4,386,649 A | 6/1983 | Hines et al. | |
| 4,388,692 A | 6/1983 | Jones et al. | |
| 4,431,134 A | 2/1984 | Hendricks et al. | |
| 4,442,972 A | 4/1984 | Sahay et al. | |
| 4,446,913 A | 5/1984 | Krocker et al. | |
| 4,479,604 A | 10/1984 | Didner | |
| 4,503,471 A | 3/1985 | Hanajima et al. | |
| 4,506,827 A | 3/1985 | Jamieson et al. | |
| 4,556,169 A | 12/1985 | Zervos | |
| 4,585,164 A | 4/1986 | Butkovich et al. | |
| 4,606,401 A | 8/1986 | Levine et al. | |
| 4,621,336 A | 11/1986 | Brown | |
| 4,622,544 A | 11/1986 | Bially et al. | |
| 4,628,201 A | 12/1986 | Schmitt | |
| 4,646,964 A | 3/1987 | Parker et al. | |
| 4,717,333 A | 1/1988 | Carignan | |
| 4,725,001 A | 2/1988 | Carney et al. | |
| 4,837,731 A | 6/1989 | Levine et al. | |
| 4,881,686 A | 11/1989 | Mehta | |
| 4,918,439 A | 4/1990 | Wozniak et al. | |
| 4,942,613 A | 7/1990 | Lynch | |
| 4,948,040 A | 8/1990 | Kobayashi et al. | |
| 4,969,508 A | 11/1990 | Tate et al. | |
| 4,992,779 A | 2/1991 | Sugino et al. | |
| 4,997,029 A | 3/1991 | Otsuka et al. | |
| 5,005,365 A | 4/1991 | Lynch | |
| 5,012,973 A | 5/1991 | Dick et al. | |
| 5,036,698 A | 8/1991 | Conti | |
| 5,038,851 A | 8/1991 | Mehta | |
| 5,053,752 A | 10/1991 | Epstein et al. | |
| 5,065,813 A | 11/1991 | Berkeley et al. | |
| 5,086,385 A | 2/1992 | Launey et al. | |
| 5,088,645 A | 2/1992 | Bell | |
| 5,140,310 A | 8/1992 | DeLuca et al. | |
| 5,161,606 A | 11/1992 | Berkeley et al. | |
| 5,170,935 A | 12/1992 | Federspiel et al. | |
| 5,172,565 A | 12/1992 | Wruck et al. | |
| 5,181,653 A | 1/1993 | Foster et al. | |
| 5,187,797 A | 2/1993 | Nielsen et al. | |
| 5,230,482 A | 7/1993 | Ratz et al. | |
| 5,238,184 A | 8/1993 | Adams | |
| 5,251,813 A | 10/1993 | Kniepkamp | |
| 5,259,445 A | 11/1993 | Pratt et al. | |
| 5,272,477 A | 12/1993 | Tashima et al. | |
| 5,329,991 A | 7/1994 | Mehta et al. | |
| 5,348,078 A | 9/1994 | Dushane et al. | |
| 5,351,035 A | 9/1994 | Chrisco | |
| 5,386,577 A | 1/1995 | Zenda | |
| 5,390,206 A | 2/1995 | Rein et al. | |
| 5,404,934 A | 4/1995 | Carlson et al. | |
| 5,414,618 A | 5/1995 | Mock et al. | |
| 5,429,649 A | 7/1995 | Robin | |
| 5,442,730 A | 8/1995 | Bigus | |
| 5,482,209 A | 1/1996 | Cochran et al. | |
| 5,495,887 A | 3/1996 | Kathnelson et al. | |
| 5,506,572 A | 4/1996 | Hills et al. | |
| 5,526,422 A | 6/1996 | Keen | |
| 5,537,106 A | 7/1996 | Mitsuhashi | |
| 5,544,036 A | 8/1996 | Brown, Jr. et al. | |
| 5,566,879 A | 10/1996 | Longtin | |
| 5,570,837 A | 11/1996 | Brown et al. | |
| 5,590,831 A | 1/1997 | Manson et al. | |
| 5,603,451 A | 2/1997 | Helander et al. | |
| 5,654,813 A | 8/1997 | Whitworth | |
| 5,668,535 A | 9/1997 | Hendrix et al. | |
| 5,671,083 A | 9/1997 | Conner et al. | |
| 5,673,850 A | 10/1997 | Uptegraph | |
| 5,679,137 A | 10/1997 | Erdman et al. | |
| 5,682,206 A | 10/1997 | Wehmeyer et al. | |
| 5,711,785 A | 1/1998 | Maxwell | |
| 5,732,691 A | 3/1998 | Maiello et al. | |
| 5,761,083 A | 6/1998 | Brown, Jr. et al. | |
| 5,782,296 A | 7/1998 | Mehta | |
| 5,810,908 A | 9/1998 | Gray et al. | |
| 5,818,428 A | 10/1998 | Eisenbrandt et al. | |
| 5,833,134 A | 11/1998 | Ho et al. | |
| 5,839,654 A | 11/1998 | Weber | |
| 5,840,094 A | 11/1998 | Osendorf et al. | |
| 5,862,737 A | 1/1999 | Chiu et al. | |
| 5,873,519 A | 2/1999 | Beilfuss | |
| 5,886,697 A | 3/1999 | Naughton et al. | |
| 5,901,183 A | 5/1999 | Garin et al. | |
| 5,902,183 A | 5/1999 | D'Souza | |
| 5,909,429 A | 6/1999 | Satyanarayana et al. | |
| 5,915,473 A | 6/1999 | Ganesh et al. | |
| 5,917,141 A | 6/1999 | Naquin, Jr. | |
| D413,328 S | 8/1999 | Kazama | |
| 5,937,942 A | 8/1999 | Bias et al. | |
| 5,947,372 A | 9/1999 | Tiernan | |
| 5,950,709 A | 9/1999 | Krueger et al. | |
| 6,009,355 A | 12/1999 | Obradovich et al. | |
| 6,013,121 A | 1/2000 | Chiu et al. | |
| 6,020,881 A | 2/2000 | Naughton et al. | |
| 6,032,867 A | 3/2000 | Dushane et al. | |
| D422,594 S | 4/2000 | Henderson et al. | |
| 6,059,195 A | 5/2000 | Adams et al. | |
| 6,081,197 A | 6/2000 | Garrick et al. | |
| 6,084,523 A | 7/2000 | Gelnovatch et al. | |
| 6,098,893 A | 8/2000 | Berglund et al. | |
| 6,101,824 A | 8/2000 | Meyer et al. | |
| 6,104,963 A | 8/2000 | Cebasek et al. | |
| 6,119,125 A | 9/2000 | Gloudeman et al. | |
| 6,121,875 A | 9/2000 | Hamm et al. | |
| 6,140,987 A | 10/2000 | Stein et al. | |
| 6,141,595 A | 10/2000 | Gloudeman et al. | |
| 6,145,751 A | 11/2000 | Ahmed | |
| 6,149,065 A | 11/2000 | White et al. | |
| 6,152,375 A | 11/2000 | Robison | |
| 6,154,681 A | 11/2000 | Drees et al. | |
| 6,167,316 A | 12/2000 | Gloudeman et al. | |
| 6,190,442 B1 | 2/2001 | Redner | |
| 6,192,282 B1 | 2/2001 | Smith et al. | |
| 6,196,467 B1 | 3/2001 | Dushane et al. | |
| 6,208,331 B1 | 3/2001 | Singh et al. | |
| 6,216,956 B1 | 4/2001 | Ehlers et al. | |
| 6,236,326 B1 | 5/2001 | Murphy | |
| 6,259,074 B1 | 7/2001 | Brunner et al. | |

(56) References Cited

U.S. PATENT DOCUMENTS

| | | |
|---|---|---|
| 6,260,765 B1 | 7/2001 | Natale et al. |
| 6,285,912 B1 | 9/2001 | Ellison et al. |
| 6,290,140 B1 | 9/2001 | Pesko et al. |
| D448,757 S | 10/2001 | Okubo |
| 6,315,211 B1 | 11/2001 | Sartain et al. |
| 6,318,639 B1 | 11/2001 | Toth |
| 6,321,637 B1 | 11/2001 | Shanks et al. |
| 6,330,806 B1 | 12/2001 | Beaverson et al. |
| 6,344,861 B1 | 2/2002 | Naugthon et al. |
| 6,351,693 B1 | 2/2002 | Monie et al. |
| 6,385,510 B1 | 5/2002 | Hoog et al. |
| 6,394,359 B1 | 5/2002 | Morgan |
| 6,398,118 B1 | 6/2002 | Rosen et al. |
| 6,400,956 B1 | 6/2002 | Richton |
| 6,448,896 B1 | 9/2002 | Bankus et al. |
| 6,449,726 B1 | 9/2002 | Smith |
| 6,453,687 B2 | 9/2002 | Sharood et al. |
| D464,948 S | 10/2002 | Vasquez et al. |
| 6,460,774 B2 | 10/2002 | Sumida et al. |
| 6,466,132 B1 | 10/2002 | Caronna et al. |
| 6,478,233 B1 | 11/2002 | Shah |
| 6,502,758 B2 | 1/2003 | Cottrell |
| 6,507,282 B1 | 1/2003 | Sherwood |
| 6,518,953 B1 | 2/2003 | Armstrong |
| 6,518,957 B1 | 2/2003 | Lehtinen et al. |
| 6,526,462 B1 | 2/2003 | Elabd |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,578,005 B1 | 6/2003 | Lesaint et al. |
| 6,578,770 B1 | 6/2003 | Rosen |
| 6,580,950 B1 | 6/2003 | Johnson et al. |
| 6,581,846 B1 | 6/2003 | Rosen |
| 6,595,430 B1 | 7/2003 | Shah |
| 6,596,059 B1 | 7/2003 | Greist et al. |
| D478,051 S | 8/2003 | Sagawa |
| 6,608,560 B2 | 8/2003 | Abrams |
| 6,619,555 B2 | 9/2003 | Rosen |
| 6,621,507 B1 | 9/2003 | Shah |
| 6,663,010 B2 | 12/2003 | Chene et al. |
| 6,685,098 B2 | 2/2004 | Okano et al. |
| 6,726,112 B1 | 4/2004 | Ho |
| D492,282 S | 6/2004 | Lachello et al. |
| 6,783,079 B2 | 8/2004 | Carey et al. |
| 6,786,421 B2 | 9/2004 | Rosen |
| 6,789,739 B2 | 9/2004 | Rosen |
| 6,801,849 B2 | 10/2004 | Szukala et al. |
| 6,810,307 B1 | 10/2004 | Addy |
| 6,810,397 B1 | 10/2004 | Qian et al. |
| 6,824,069 B2 | 11/2004 | Rosen |
| 6,833,990 B2 | 12/2004 | LaCroix et al. |
| 6,842,721 B2 | 1/2005 | Kim et al. |
| 6,856,605 B1 | 2/2005 | Larghi et al. |
| 6,868,293 B1 | 3/2005 | Schurr et al. |
| 6,934,862 B2 | 8/2005 | Sharood et al. |
| 6,965,313 B1 | 11/2005 | Saylor et al. |
| D512,208 S | 12/2005 | Kubo et al. |
| 6,973,410 B2 | 12/2005 | Seigel |
| 7,001,495 B2 | 2/2006 | Essalik et al. |
| D520,989 S | 5/2006 | Miller |
| 7,050,026 B1 | 5/2006 | Rosen |
| 7,055,759 B2 | 6/2006 | Wacker et al. |
| 7,080,358 B2 | 7/2006 | Kuzmin |
| 7,083,109 B2 | 8/2006 | Pouchak |
| 7,083,189 B2 | 8/2006 | Ogata |
| 7,089,088 B2 | 8/2006 | Terry et al. |
| 7,108,194 B1 | 9/2006 | Hankins, II |
| 7,113,090 B1 | 9/2006 | Saylor et al. |
| 7,124,087 B1 | 10/2006 | Rodriguez et al. |
| 7,127,734 B1 | 10/2006 | Amit |
| 7,130,719 B2 | 10/2006 | Ehlers et al. |
| 7,130,720 B2 | 10/2006 | Fisher |
| D531,588 S | 11/2006 | Peh |
| D533,515 S | 12/2006 | Klein et al. |
| 7,146,253 B2 | 12/2006 | Hoog et al. |
| 7,152,058 B2 | 12/2006 | Shotton et al. |
| 7,152,806 B1 | 12/2006 | Rosen |
| 7,155,305 B2 | 12/2006 | Hayes et al. |
| 7,156,318 B1 | 1/2007 | Rosen |
| 7,159,789 B2 | 1/2007 | Schwendinger et al. |
| 7,163,156 B2 | 1/2007 | Kates |
| 7,188,002 B2 | 3/2007 | Chapman, Jr. et al. |
| D542,236 S | 5/2007 | Klein et al. |
| 7,212,887 B2 | 5/2007 | Shah et al. |
| 7,222,800 B2 | 5/2007 | Wruck |
| 7,225,054 B2 | 5/2007 | Amundson et al. |
| 7,231,605 B1 | 6/2007 | Ramakesavan |
| 7,232,075 B1 | 6/2007 | Rosen |
| 7,240,289 B2 | 7/2007 | Naughton et al. |
| 7,244,294 B2 | 7/2007 | Kates |
| 7,257,397 B2 | 8/2007 | Shamoon et al. |
| 7,261,762 B2 | 8/2007 | Kang et al. |
| 7,274,973 B2 | 9/2007 | Nichols et al. |
| 7,284,304 B2 | 10/2007 | Fenton et al. |
| 7,302,642 B2 | 11/2007 | Smith et al. |
| 7,331,187 B2 | 2/2008 | Kates |
| 7,333,460 B2 | 2/2008 | Vaisanen et al. |
| 7,341,201 B2 | 3/2008 | Stanimirovic |
| 7,343,226 B2 | 3/2008 | Ehlers et al. |
| 7,354,005 B2 | 4/2008 | Carey et al. |
| RE40,431 E | 7/2008 | Robitschko et al. |
| RE40,437 E | 7/2008 | Rosen |
| 7,419,532 B2 | 9/2008 | Sellers et al. |
| 7,434,742 B2 | 10/2008 | Mueller et al. |
| 7,435,278 B2 | 10/2008 | Terlson |
| 7,451,017 B2 | 11/2008 | McNally et al. |
| 7,451,606 B2 | 11/2008 | Harrod |
| 7,452,396 B2 | 11/2008 | Terlson et al. |
| 7,469,151 B2 | 12/2008 | Khan et al. |
| 7,483,964 B1 | 1/2009 | Jackson et al. |
| 7,496,627 B2 | 2/2009 | Moorer et al. |
| 7,505,914 B2 | 3/2009 | McCall |
| 7,510,126 B2 | 3/2009 | Rossi et al. |
| 7,542,867 B2 | 6/2009 | Steger et al. |
| 7,556,207 B2 | 7/2009 | Mueller et al. |
| 7,565,225 B2 | 7/2009 | Dushane et al. |
| 7,574,208 B2 | 8/2009 | Hanson et al. |
| 7,594,960 B2 | 9/2009 | Johansson |
| 7,604,046 B2 | 10/2009 | Bergman et al. |
| 7,617,691 B2 | 11/2009 | Street et al. |
| 7,644,591 B2 | 1/2010 | Singh et al. |
| 7,665,019 B2 | 2/2010 | Jaeger |
| 7,668,532 B2 | 2/2010 | Shamoon et al. |
| 7,676,282 B2 | 3/2010 | Bosley |
| 7,703,694 B2 | 4/2010 | Mueller et al. |
| 7,707,189 B2 | 4/2010 | Haselden et al. |
| 7,713,339 B2 | 5/2010 | Johansson |
| 7,734,572 B2 | 6/2010 | Wiemeyer et al. |
| 7,739,282 B1 | 6/2010 | Smith et al. |
| 7,770,242 B2 | 8/2010 | Sell |
| 7,793,056 B2 | 9/2010 | Boggs et al. |
| 7,814,516 B2 | 10/2010 | Stecyk et al. |
| 7,865,252 B2 | 1/2011 | Clayton |
| 7,894,944 B2 | 2/2011 | Liu et al. |
| 7,904,209 B2 | 3/2011 | Podgomy et al. |
| 7,941,431 B2 | 5/2011 | Bluhm et al. |
| 7,949,615 B2 | 5/2011 | Ehlers et al. |
| 7,957,775 B2 | 6/2011 | Allen, Jr. et al. |
| 7,963,454 B2 | 6/2011 | Sullivan et al. |
| 7,984,220 B2 | 7/2011 | Gerard et al. |
| 8,005,576 B2 | 8/2011 | Rodgers |
| 8,010,237 B2 | 8/2011 | Cheung et al. |
| 8,019,567 B2 | 9/2011 | Steinberg et al. |
| 8,024,073 B2 | 9/2011 | Imes et al. |
| 8,032,254 B2 | 10/2011 | Amundson et al. |
| 8,050,801 B2 | 11/2011 | Richards et al. |
| 8,060,470 B2 | 11/2011 | Davidson et al. |
| 8,063,775 B2 | 11/2011 | Reed et al. |
| 8,081,616 B2 | 12/2011 | Kito |
| 8,082,065 B2 | 12/2011 | Imes et al. |
| 8,087,593 B2 | 1/2012 | Leen |
| 8,091,796 B2 | 1/2012 | Amundson et al. |
| 8,099,195 B2 | 1/2012 | Imes et al. |
| 8,108,076 B2 | 1/2012 | Imes et al. |

(56) References Cited

U.S. PATENT DOCUMENTS

| | | |
|---|---|---|
| 8,116,917 B2 | 2/2012 | Rodgers |
| 8,126,685 B2 | 2/2012 | Nasle |
| 8,126,999 B2 | 2/2012 | Bahl et al. |
| 8,131,401 B2 | 3/2012 | Nasle |
| 8,131,506 B2 | 3/2012 | Steinberg et al. |
| 8,135,413 B2 | 3/2012 | Dupray |
| 8,140,279 B2 | 3/2012 | Subbloie |
| 8,150,421 B2 | 4/2012 | Ward et al. |
| 8,167,216 B2 | 5/2012 | Schultz et al. |
| 8,180,492 B2 | 5/2012 | Steinberg |
| 8,195,309 B2 | 6/2012 | Hegde et al. |
| 8,229,722 B2 | 7/2012 | Nasle |
| 8,239,066 B2 | 8/2012 | Jennings et al. |
| 8,255,090 B2 | 8/2012 | Frader-Thompson et al. |
| 8,276,829 B2 | 10/2012 | Stoner et al. |
| 8,331,544 B2 | 12/2012 | Kraus et al. |
| 8,332,055 B2 | 12/2012 | Veillette |
| 8,334,906 B2 | 12/2012 | Lipton et al. |
| 8,340,326 B2 | 12/2012 | Rauenzahn |
| 8,346,396 B2 | 1/2013 | Amundson et al. |
| 8,350,697 B2 | 1/2013 | Trundle et al. |
| 8,390,473 B2 | 3/2013 | Krzyzanowski et al. |
| 8,392,561 B1 * | 3/2013 | Dyer .................. H04L 63/0281 709/225 |
| 8,406,162 B2 | 3/2013 | Haupt et al. |
| 8,412,654 B2 | 4/2013 | Montalvo |
| 8,423,322 B2 | 4/2013 | Steinberg et al. |
| 8,432,322 B2 | 4/2013 | Amm et al. |
| 8,442,693 B2 | 5/2013 | Mirza et al. |
| 8,442,695 B2 | 5/2013 | Imes et al. |
| 8,509,954 B2 | 8/2013 | Imes et al. |
| 8,510,421 B2 | 8/2013 | Matsuzaki et al. |
| 8,531,989 B2 | 9/2013 | Radhakrishnan et al. |
| 8,532,190 B2 | 9/2013 | Shimizu et al. |
| 8,532,674 B2 | 9/2013 | Arun et al. |
| 8,554,374 B2 | 10/2013 | Lunacek et al. |
| 8,556,188 B2 | 10/2013 | Steinberg |
| 8,574,343 B2 | 11/2013 | Bisson et al. |
| 8,577,392 B1 | 11/2013 | Pai et al. |
| 8,582,471 B2 | 11/2013 | Yun et al. |
| 8,587,445 B2 | 11/2013 | Rockwell |
| 8,600,556 B2 | 12/2013 | Nesler et al. |
| 8,606,374 B2 | 12/2013 | Fadell et al. |
| 8,606,554 B2 | 12/2013 | Zimmermann et al. |
| 8,613,792 B2 | 12/2013 | Ragland et al. |
| 8,623,117 B2 | 1/2014 | Zavodny et al. |
| 8,634,796 B2 | 1/2014 | Johnson |
| 8,639,990 B2 | 1/2014 | Yasukawa |
| 8,657,936 B2 | 2/2014 | Sullivan |
| 8,660,813 B2 | 2/2014 | Curtis et al. |
| 8,666,558 B2 | 3/2014 | Wang et al. |
| 8,704,672 B2 | 4/2014 | Hoglund et al. |
| 8,725,831 B2 | 5/2014 | Barbeau et al. |
| 8,731,723 B2 | 5/2014 | Boll et al. |
| 8,734,565 B2 | 5/2014 | Hoglund et al. |
| 8,812,136 B2 | 8/2014 | Martin-Cocher et al. |
| 8,843,239 B2 | 9/2014 | Mighdoll et al. |
| 8,868,254 B2 | 10/2014 | Louboutin |
| 8,881,172 B2 | 11/2014 | Schneider |
| 8,886,179 B2 | 11/2014 | Pathuri et al. |
| 8,892,223 B2 | 11/2014 | Leen et al. |
| 8,902,071 B2 | 12/2014 | Barton et al. |
| 8,950,686 B2 | 2/2015 | Matsuoka et al. |
| 8,954,201 B2 | 2/2015 | Tepper et al. |
| 8,965,585 B2 | 2/2015 | Lombard et al. |
| 9,002,523 B2 | 4/2015 | Erickson et al. |
| 9,033,255 B2 | 5/2015 | Tessier et al. |
| 9,071,453 B2 | 6/2015 | Shoemaker et al. |
| 9,080,784 B2 | 7/2015 | Dean-Hendricks et al. |
| 9,134,710 B2 | 9/2015 | Cheung et al. |
| 9,143,332 B2 | 9/2015 | Nass |
| 9,206,993 B2 | 12/2015 | Barton et al. |
| 9,209,652 B2 | 12/2015 | Imes et al. |
| 9,247,378 B2 | 1/2016 | Bisson et al. |
| 9,270,645 B2 * | 2/2016 | Dyer .................. H04L 63/029 |
| 9,366,448 B2 | 6/2016 | Dean-Hendricks et al. |
| 9,374,268 B2 | 6/2016 | Budde et al. |
| 9,426,736 B2 | 8/2016 | Kim et al. |
| 9,442,500 B2 | 9/2016 | Nichols et al. |
| 9,453,655 B2 | 9/2016 | Bruck et al. |
| 9,477,239 B2 | 10/2016 | Bergman et al. |
| 9,488,994 B2 | 11/2016 | Zywicki et al. |
| 9,531,593 B2 | 12/2016 | Baum et al. |
| 9,557,723 B2 | 1/2017 | Nasle |
| 9,594,384 B2 | 3/2017 | Bergman et al. |
| 9,602,172 B2 | 3/2017 | Jackson et al. |
| 9,657,957 B2 | 5/2017 | Bergman et al. |
| 10,142,421 B2 * | 11/2018 | Mighdoll ................. F24F 11/30 |
| 10,375,172 B2 * | 8/2019 | Bugenhagen ........... H04L 67/12 |
| 2001/0025349 A1 | 9/2001 | Sharood et al. |
| 2001/0029585 A1 | 10/2001 | Simon et al. |
| 2001/0042684 A1 | 11/2001 | Essalik et al. |
| 2001/0052459 A1 | 12/2001 | Essalik et al. |
| 2002/0005435 A1 | 1/2002 | Cottrell |
| 2002/0011923 A1 | 1/2002 | Cunningham et al. |
| 2002/0022991 A1 | 2/2002 | Sharood et al. |
| 2002/0029256 A1 | 3/2002 | Zintel |
| 2002/0060701 A1 | 5/2002 | Naughton et al. |
| 2002/0082746 A1 | 6/2002 | Schubring et al. |
| 2002/0092779 A1 | 7/2002 | Essalik et al. |
| 2002/0096572 A1 | 7/2002 | Chene et al. |
| 2002/0138184 A1 | 9/2002 | Kipersztok et al. |
| 2002/0147006 A1 | 10/2002 | Coon et al. |
| 2002/0171624 A1 | 11/2002 | Stecyk et al. |
| 2002/0173929 A1 | 11/2002 | Seigel |
| 2003/0000692 A1 | 1/2003 | Takaski et al. |
| 2003/0009771 A1 | 1/2003 | Chang |
| 2003/0014179 A1 | 1/2003 | Szukala et al. |
| 2003/0033156 A1 | 2/2003 | McCall |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2003/0070544 A1 | 4/2003 | Mulvaney et al. |
| 2003/0074489 A1 | 4/2003 | Steger et al. |
| 2003/0103075 A1 | 6/2003 | Rosselot |
| 2003/0121652 A1 | 7/2003 | Carey et al. |
| 2003/0123224 A1 | 7/2003 | LaCroix et al. |
| 2003/0136135 A1 | 7/2003 | Kim et al. |
| 2003/0142121 A1 | 7/2003 | Rosen |
| 2003/0150926 A1 | 8/2003 | Rosen |
| 2003/0150927 A1 | 8/2003 | Rosen |
| 2003/0177012 A1 | 9/2003 | Drennan |
| 2004/0034484 A1 | 2/2004 | Solomita et al. |
| 2004/0193324 A1 | 3/2004 | Hoog et al. |
| 2004/0074978 A1 | 4/2004 | Rosen |
| 2004/0117046 A1 | 6/2004 | Colle et al. |
| 2004/0133314 A1 | 7/2004 | Ehlers et al. |
| 2004/0192284 A1 | 9/2004 | Vaisanen |
| 2004/0245352 A1 | 12/2004 | Smith |
| 2004/0262410 A1 | 12/2004 | Hull |
| 2005/0055432 A1 | 3/2005 | Rodgers |
| 2005/0083168 A1 | 4/2005 | Breitenbach |
| 2005/0090915 A1 | 4/2005 | Geiwitz |
| 2005/0172056 A1 | 8/2005 | Ahn |
| 2005/0177631 A1 | 8/2005 | Bahl |
| 2005/0194456 A1 | 9/2005 | Tessier et al. |
| 2005/0270151 A1 | 12/2005 | Winick |
| 2006/0032379 A1 | 2/2006 | Kates |
| 2006/0063522 A1 | 3/2006 | McFarland |
| 2006/0071086 A1 | 4/2006 | Kates |
| 2006/0097063 A1 | 5/2006 | Zeevi |
| 2006/0168342 A1 | 7/2006 | Budde et al. |
| 2006/0186213 A1 | 8/2006 | Carey et al. |
| 2006/0196953 A1 | 9/2006 | Simon et al. |
| 2006/0219799 A1 | 10/2006 | Schultz et al. |
| 2006/0242591 A1 | 10/2006 | Van Dok et al. |
| 2006/0283965 A1 | 12/2006 | Mueller et al. |
| 2007/0013534 A1 | 1/2007 | DiMaggio |
| 2007/0029397 A1 | 2/2007 | Mueller et al. |
| 2007/0037605 A1 | 2/2007 | Logan |
| 2007/0038563 A1 | 2/2007 | Ryzerski |
| 2007/0043477 A1 * | 2/2007 | Ehlers .................... G06Q 10/10 700/276 |
| 2007/0043478 A1 | 2/2007 | Ehlers et al. |

(56) References Cited

U.S. PATENT DOCUMENTS

| | | |
|---|---|---|
| 2007/0045429 A1 | 3/2007 | Chapman, Jr. et al. |
| 2007/0060171 A1 | 3/2007 | Sudit et al. |
| 2007/0106548 A1 | 5/2007 | Bratt |
| 2007/0114293 A1 | 5/2007 | Gugenheim |
| 2007/0114295 A1 | 5/2007 | Jenkins |
| 2007/0115902 A1 | 5/2007 | Shamoon et al. |
| 2007/0155401 A1 | 7/2007 | Ward et al. |
| 2007/0249319 A1 | 10/2007 | Faulkner et al. |
| 2007/0277061 A1 | 11/2007 | Ashe |
| 2007/0278320 A1 | 12/2007 | Lunacek et al. |
| 2007/0285510 A1 | 12/2007 | Lipton et al. |
| 2007/0287473 A1 | 12/2007 | Dupray |
| 2007/0289731 A1 | 12/2007 | Deligiannis et al. |
| 2008/0015740 A1 | 1/2008 | Osann, Jr. |
| 2008/0058014 A1 | 3/2008 | Khan et al. |
| 2008/0262820 A1 | 10/2008 | Nasle |
| 2008/0298375 A1 | 12/2008 | Argardh et al. |
| 2009/0012704 A1 | 1/2009 | Franco et al. |
| 2009/0022076 A1 | 1/2009 | Canpolat et al. |
| 2009/0045263 A1 | 2/2009 | Mueller et al. |
| 2009/0063122 A1 | 3/2009 | Nasle |
| 2009/0076749 A1 | 3/2009 | Nasle |
| 2009/0082885 A1 | 3/2009 | Nass |
| 2009/0083167 A1 | 3/2009 | Subbloie |
| 2009/0138099 A1 | 5/2009 | Veillette |
| 2009/0140056 A1 | 6/2009 | Leen |
| 2009/0140060 A1 | 6/2009 | Stoner et al. |
| 2009/0140062 A1 | 6/2009 | Amundson et al. |
| 2009/0143879 A1 | 6/2009 | Amundsom et al. |
| 2009/0143880 A1 | 6/2009 | Amundson et al. |
| 2009/0143916 A1 | 6/2009 | Boll et al. |
| 2009/0157529 A1 | 6/2009 | Ehlers et al. |
| 2009/0165644 A1 | 7/2009 | Campbell |
| 2009/0187499 A1 | 7/2009 | Mulder et al. |
| 2009/0195349 A1 | 8/2009 | Frader-Thompson et al. |
| 2009/0199212 A1 | 8/2009 | Schneider |
| 2009/0240381 A1 | 9/2009 | Lane |
| 2009/0259346 A1 | 10/2009 | Reed et al. |
| 2009/0302994 A1 | 12/2009 | Rhee et al. |
| 2009/0307573 A1 | 12/2009 | Lavelle et al. |
| 2009/0316671 A1 | 12/2009 | Rolf et al. |
| 2010/0008422 A1 | 1/2010 | Shimizu et al. |
| 2010/0034386 A1 | 2/2010 | Choong et al. |
| 2010/0069035 A1 | 3/2010 | Johnson |
| 2010/0084482 A1 | 4/2010 | Kennedy et al. |
| 2010/0088261 A1 | 4/2010 | Montalvo |
| 2010/0107112 A1 | 4/2010 | Jennings et al. |
| 2010/0146071 A1 | 6/2010 | Comerford et al. |
| 2010/0156665 A1 | 6/2010 | Krzyzanowski et al. |
| 2010/0161574 A1 | 6/2010 | Davidson et al. |
| 2010/0168924 A1 | 7/2010 | Tessier et al. |
| 2010/0188239 A1 | 7/2010 | Rockwell |
| 2010/0197238 A1 | 8/2010 | Pathuri et al. |
| 2010/0204834 A1 | 8/2010 | Comerford et al. |
| 2010/0261465 A1 | 10/2010 | Rhoads et al. |
| 2010/0269049 A1 | 10/2010 | Fearon |
| 2010/0280667 A1 | 11/2010 | Steinberg |
| 2010/0289643 A1 | 11/2010 | Trundle et al. |
| 2010/0302064 A1 | 12/2010 | Rodgers |
| 2010/0324962 A1 | 12/2010 | Nesler et al. |
| 2011/0004355 A1 | 1/2011 | Wang et al. |
| 2011/0022190 A1 | 1/2011 | Hegde et al. |
| 2011/0022242 A1 | 1/2011 | Bukhin et al. |
| 2011/0044208 A1 | 2/2011 | Yun et al. |
| 2011/0061527 A1 | 3/2011 | Sullivan |
| 2011/0078515 A1 | 3/2011 | Yasukawa |
| 2011/0093424 A1 | 4/2011 | Zimmermann et al. |
| 2011/0099264 A1 | 4/2011 | Chapin |
| 2011/0106278 A1 | 5/2011 | Martin-Cocher et al. |
| 2011/0106471 A1 | 5/2011 | Curtis et al. |
| 2011/0190910 A1 | 8/2011 | Lombard et al. |
| 2011/0246606 A1 | 10/2011 | Barbeau et al. |
| 2011/0290893 A1 | 12/2011 | Steinberg |
| 2011/0307103 A1 | 12/2011 | Cheung et al. |
| 2012/0005590 A1 | 1/2012 | Lombard |
| 2012/0046859 A1 | 2/2012 | Imes et al. |
| 2012/0053739 A1 | 3/2012 | Brian et al. |
| 2012/0054125 A1* | 3/2012 | Clifton .............. G05B 15/02 705/412 |
| 2012/0065783 A1 | 3/2012 | Fadell et al. |
| 2012/0065935 A1 | 3/2012 | Steinberg et al. |
| 2012/0066168 A1 | 3/2012 | Fadell et al. |
| 2012/0078425 A1 | 3/2012 | Gardenswartz |
| 2012/0086562 A1 | 4/2012 | Steinberg |
| 2012/0186774 A1 | 7/2012 | Matsuoka et al. |
| 2012/0230221 A1 | 9/2012 | Radhakrishnan et al. |
| 2012/0232678 A1 | 9/2012 | Hegde et al. |
| 2012/0239221 A1* | 9/2012 | Mighdoll .......... G05D 23/1902 700/300 |
| 2012/0278453 A1 | 11/2012 | Baum et al. |
| 2012/0307298 A1 | 12/2012 | Ishige et al. |
| 2012/0310416 A1 | 12/2012 | Tepper et al. |
| 2012/0318073 A1 | 12/2012 | Zavodny et al. |
| 2012/0318135 A1 | 12/2012 | Hoglund et al. |
| 2012/0318137 A1 | 12/2012 | Ragland et al. |
| 2012/0318138 A1 | 12/2012 | Bisson et al. |
| 2012/0319851 A1 | 12/2012 | Hoglund et al. |
| 2012/0323374 A1 | 12/2012 | Dean-Hendricks et al. |
| 2012/0323375 A1 | 12/2012 | Dean-Hendricks et al. |
| 2012/0323377 A1 | 12/2012 | Hoglund et al. |
| 2013/0020883 A1 | 1/2013 | Ashoff |
| 2013/0090767 A1 | 4/2013 | Bruck et al. |
| 2013/0158714 A1 | 6/2013 | Barton et al. |
| 2013/0158715 A1 | 6/2013 | Barton et al. |
| 2013/0158717 A1 | 6/2013 | Zywicki et al. |
| 2013/0158718 A1 | 6/2013 | Barton et al. |
| 2013/0158720 A1 | 6/2013 | Zywicki et al. |
| 2013/0178986 A1 | 7/2013 | Lombard et al. |
| 2013/0185786 A1* | 7/2013 | Dyer ................ H04L 61/2589 726/12 |
| 2013/0238142 A1 | 9/2013 | Nichols et al. |
| 2013/0245838 A1 | 9/2013 | Zywicki et al. |
| 2013/0261807 A1 | 10/2013 | Zywicki et al. |
| 2013/0288644 A1 | 10/2013 | Schroeder et al. |
| 2013/0331087 A1 | 12/2013 | Shoemaker et al. |
| 2013/0332007 A1 | 12/2013 | Louboutin |
| 2014/0031989 A1 | 1/2014 | Bergman et al. |
| 2014/0052300 A1 | 2/2014 | Matsuoka et al. |
| 2014/0070919 A1 | 3/2014 | Jackson et al. |
| 2014/0302869 A1 | 10/2014 | Rosenbaum et al. |
| 2015/0009878 A1 | 1/2015 | Kim et al. |
| 2015/0057814 A1* | 2/2015 | Mighdoll .......... G05D 23/1902 700/278 |
| 2015/0194456 A1 | 9/2015 | Tessier et al. |
| 2016/0327966 A1 | 11/2016 | Bergman et al. |
| 2017/0118037 A1* | 4/2017 | Kitchen ............. G06F 3/0488 |
| 2019/0037024 A1* | 1/2019 | Mighdoll ............. F24F 11/30 |

FOREIGN PATENT DOCUMENTS

| | | |
|---|---|---|
| EP | 0434926 B1 | 8/1995 |
| EP | 0678204 B1 | 3/2000 |
| EP | 0985994 A1 | 3/2000 |
| EP | 1033641 A1 | 9/2000 |
| EP | 1143232 A1 | 10/2001 |
| EP | 1074009 B1 | 3/2002 |
| EP | 2138919 A1 | 12/2009 |
| FR | 2711230 A1 | 4/1995 |
| WO | 9711448 A1 | 3/1997 |
| WO | 9739392 A1 | 10/1997 |
| WO | 0043870 A2 | 7/2000 |
| WO | 0057259 A2 | 9/2000 |
| WO | 0152515 A1 | 7/2001 |
| WO | 0179952 A1 | 10/2001 |
| WO | 0223744 A2 | 3/2002 |
| WO | 0227667 A1 | 4/2002 |
| WO | 0227687 A1 | 4/2002 |
| WO | 2005013231 A1 | 2/2005 |
| WO | 2009034720 A1 | 3/2009 |
| WO | 2009067251 A1 | 5/2009 |

(56) References Cited

FOREIGN PATENT DOCUMENTS

| | | |
|---|---|---|
| WO | 2010021700 A1 | 2/2010 |
| WO | 2012068517 A1 | 5/2012 |

OTHER PUBLICATIONS

Totaline, "Programmable Thermostat", Homeowner's Guide, 27 pages, Dec. 1998.
Trane, "Wireless Zone Sensor. Where Will Wireless Technology Take You?," 4 pages, Feb. 2006.
Trane, "System Programming, Tracer Summit Version 14 BMTW-SVP01D-EN," 623 pages, 2002.
Travis Industries, Remote Fireplace Thermostat, Part #99300651, 6 pages, printed Feb. 3, 2003.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.
www.nexiahome.com/products/productdetail.aspx?model=043156179510, "Trane Home Energy Management Thermostat," printed Mar. 25, 2013.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Vantage Expands Controls for Audio/Video, HVAC and Security," http://www.hometoys.com/htinews/aug99/releases/vantage03.htm, 2 pages, dated Aug. 3, 1999, printed Aug. 20, 2004.
"Comfort Link™ Smart Control," 2 pages, downloaded Mar. 25, 2013.
"Comfort™ Programmable Owner's Manual," Carrier Touch-N-Go™, 60 pages, 2010. Catalog No. 0M-TCPHP-4CA, Replaces: OM-TCPHP-3CA.
"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Home Toys Review—TouchLinc", http://www.hometoys.com/htinews/aug99/reviews/touchlinc/touchlinc.htm, 3 pages, dated Aug. 1999, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"RCS X10 Thermostat Plug-In for Home Seer Beta Version," 25 pages, downloaded Sep. 9, 2011.
"Spotlight on integrated systems," Custom Builder, V8, N2, p. 66(6), Mar.-Apr. 1993.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 4 pages, May 2001.
AED Electronics, Inc., "Presenting Climatouch the Most Innovative Thermostat in the World!," 2 pages, prior to Nov. 30, 2007.
Alarm.com, "empower™ Technical Tips." 9 pages, downloaded May 30, 2012.
Allure, "Our Technology," Allure Energy Inc., 1 page, 2012.
Andrews et al., "Clicky: User-Centric Input for Active Spaces," 17 pages, Aug. 2004.
Aprilaire Electronic Thermostats Models 8344, 8346, 8348, 8363, 8365, 8366 Operating Instructions, 8 pages, 2003.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, 52 pages, Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owners Manual, pp. 1-17, 2001.
BRK Electronics Maximum Protection Plus Ultimate Convenience Smoke Alarm, 24 pages, Sep. 2000.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p. 1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.

(56) References Cited

OTHER PUBLICATIONS

Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Apr. 21, 2005.
Carrier, "Edge Performance Programmable Owner's Manual," 64 pages, 2007.
Carrier, "Programmable Dual Fuel Thermostats," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humidity control, Outdoor UHF Temperature Transmitter 217S31, 19 pages, printed Sep. 15, 2004.
International Search Report for Corresponding Application No. PCT/US2010/042589 dated Nov. 22, 2010.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16, 2002.
DESA Heating Products, "Wireless Hand-Held Remote Control Sets Models (C) GHRCB and (C) GHRCTB, Operating Instructions," 4 pages, May 2003.
Domotique Secant Home Automation—Web Page, available at http://www.secant.ca/En/Company/Default.asp, 1 page, printed Sep. 28, 2004.
Larsson, "Battery Supervision in Telephone Exchanges," Ericsson Components AB Sweden, 5 pages, downloaded May 5, 2012.
Lennox, "Network Control Panel (NCP)," User's Manual, 18 pages, Nov. 1999.
Lennox, "Prodigy Control System," Lennox Industries, 4 pages, May 25, 2012.
Logitech, "Harmony 880 Remote User Manual," v. 1, pp. 1-15, prior to Nov. 30, 2007.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "9000RF Remote Instructions," 2 pages, prior to Nov. 30, 2007.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
Metasys, "HVAC PRO for Windows User's Manual," 308 pages, 1998.
Mounting Template for Ritetemp Thermostat 8082, 1 page, 2002.
Nichols et al., "Generating Remote Control Interfaces for Complex Appliances," chi letters, vol. 4, Issue 2, pp. 161-170, downloaded Mar. 25, 2013.
OMRON Electronic Components, LLC, "Micro Tilt Sensor D6B," Cat. No. JB301-E3-01, 6 pages, Mar. 2005.
OMRON Electronic Components, LLC, "Micro Tilt Sensor D6B," Cat. No. BO2WAD1, 2 pages, Jun. 2002.
Operation Manual for Ritetemp Touch Screen Thermostat 8082, 8 pages, 2002.
Proliphix, "Basic Series Network Thermostat Configuration Guide," Release 3.0 Revision 1, 86 pages, Jun. 2007.
Proliphix, "Proliphix IP Devices: HTTP API," Revison 1.8, 28 pages, Jan. 23, 2006.
Proliphix, "Proliphix NT10e and NT20e Configuration Guide," Revision 2.0, 54 pages, downloaded Feb. 29, 2008.
Proliphix, "Proliphix Remote Management User Guide," 12 pages, Apr. 23, 2008.
Proliphix, "Web Enabled IP Thermostats," 2 pages, downloaded Jun. 11, 2007.
Quick Start Guide for Ritetemp Thermostat 8082, 1 page, 2002.
Radio Thermostat, "Install Guide CT80," 8 pages, downloaded Apr. 26, 2011.
Radio Thermostat, "Intro," 3 pages, printed Mar. 25, 2013.
Radio Thermostat, "Operation Guide CT80," 8 pages, downloaded Mar. 14, 2011.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Saravanan et al, "Reconfigurable Wireless Interface for Networking Sensors," IJCSNS International Journal of Computer Science and Network Security, vol. 8 No. 7, pp. 270-276, revised Jul. 20, 2008.
Screenshot of http://lagotek.com/index.html?currentSection=TouchIt, Lagotek, 1 page, prior to Mar. 29, 2012.
Sealed Unit Parts Co., Inc., Supco & CTC Thermostats . . . loaded with features, designed for value!, 6 pages, prior to Apr. 21, 2005.
Sharp Corporation, "GP1S036HEZ Phototransistor Output, Transmissive Photointerrupter with Tilt Direction (4-Direction) Detecting," pp. 1-11, Oct. 3, 2005.
SmartAC, "Thermostat Programming Web Site Guide," PG-WC-7E, 2 pages, 2009.
Sync Blog, "How to Control Your Thermostat from Anywhere Without Breaking the Bank (2)," 9 pages, downloaded Mar. 25, 2013.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 for All Programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "P/N P374-0431 Thermostat Remote Control and Receiver," Owner's Manual, 11 pages, prior to Nov. 30, 2007.
Totaline, "P474-1100RF, P474-1100REC Wireless Thermostat," 1 page, prior to Nov. 30, 2007.
Totaline, "Programmable Thermostat Configurable for Advanced Heat Pump or Dual Fuel Operation," Owner's Manual P/N P374-1500, 24 pages, Jun. 1999.
Totaline, "Wireless Remote Sensor, Model P474-0401-1RF/REC," 2 pages, prior to Nov. 30, 2007.
Emme Core User Guide, Version 1.1, 47 pages, Jan. 2011.
Firex Smoke Alarm, Ionization Models AD, ADC Photoelectric Model Pad, 4 pages, prior to Apr. 21, 2005.
Fluke, "561 HVAC Pro" Infrared Thermometer User's Manual, 22 pages, downloaded May 24, 2012.
Freudenthal et al., "Communicating Extensive Smart Home Functionality to Users of All Ages: the Design of a Mixed-Initiative Multimodal Thermostat-Interface," pp. 34-39, Mar. 12-13, 2001.

(56) References Cited

OTHER PUBLICATIONS

Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Gupta et al., "Adding GPS Control to Traditional Thermostats: An Exploration of Potential Energy Savings and Design Challenges," Massachusetts Institute of Technology, 18 pages, prior to Apr. 16, 2012.
Gupta, "A Persuasive GPS-Controlled Thermostat System," Master's Thesis, Massachusetts Institute of Technology, 89 pages, Sep. 2008.
Guttman, "Autoconfiguration for IP Networking: Enabling Local Communication," 6 pages, IEEE Internet Computing, Jun. 2011.
Harris et al., "Optimizing Memory Transactions," Microsoft Research Havard University, 12 pages, May 25, 2012.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 20," Operator Manual, 70 pages, Apr. 1995.
Honeywell, "Installation Guide: Wireless Entry/Exit Remote," 12 pages, 2011.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "RedLINK™ Wireless Comfort Systems," RedLINK Wireless Technology, 8 pages, Aug. 2011.
Honeywell, "Total Connect Online Help Guide," Revision A, 800-02577-TC, Mar. 2010.
Honeywell, "Total Connect User Guide," Revision B, 34 pages, May 15, 2012.
Honeywell, "VisionPRO® 8000 Thermostats," Honeywell International Inc., 2 pages, downloaded May 24, 2012.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
Honeywell, Wireless Entry/Exit Remote, Operating Manual, 9 pages, 2011.
http://hunter-thermostats.com/hunter_programmable_thermostats.html, Hunter Thermostat 44668 Specifications, and 44758 Specifications, 2 pages, printed Jul. 13, 2011.
http://www.alarm.com/about/media/MediaGeneric.aspx?cmid=39, "Alarm.com Cloud Services May Yield Smartest Thermostats on the Planet," Alarm.com, 2 pages, printed Apr. 24, 2012.
http://www.cc.gatech.edu/computing/classes/cs6751_94_fall/groupc/climate-2/node1.html, "Contents," 53 pages, printed Sep. 20, 2004.
http://www.comcast.com/homesecurity/features-web.htm/SCRedirect=true, "Xfinity Web Portal," 2 pages, downloaded Mar. 2, 2012.
http://www.hometoys.com/htinews/apr99/releases/ha101.htm, "HTI News Release," 3 pages, Apr. 1999.
http://www.ritetemp.info/rtMenu_13.html, Rite Temp 8082, 6 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
http://www/exefind.com/cybermatrix-meeting-manager, "CyberMatrix Meeting Manager Web," 1 page, printed Dec. 2, 2008.
Hunter, "44200/44250," Owner's Manual, 32 pages, prior to Jul. 7, 2004.
Hunter, "Auto Saver 550", Owner's Manual Model 44550, 44 pages, prior to Jul. 7, 2004.
Hunter, "Model 44758 Remote Sensor," Owner's Manual, 2 pages, Revision Sep. 4, 2008.
Install Guide for Ritetemp Thermostat 8082, 6 pages, 2002.
Intwine Energy, "IECT-210," 1 page, downloaded Mar. 2, 2012.
Intwine Energy, "Intwine Solutions," http://www.intwineenergy.com/penhems.html, 2 pages, copyright 2010.
Invensys™, "9700i 9701i 9715i 9720i Deluxe Programmable Thermostats," User's Manual, pp. 1-28, prior to Jul. 7, 2004.
Jacobson, "Alarm.com Cloud Service May Yield Smartest Thermostat on the Planet," www.cepro.com/article/alarmcom_cloud_service_may_yield_smartest_thermostat_on_the_planet/D2/, 6 pages, downloaded Jan. 31, 2013.
Hunter, "44300/44350," Owner's Manual, 35 pages, accessed on or about Jul. 7, 2004, 36 pp.
Lux, "605/2110 Series Programmable Heat Pump Thermostat," Owner's Manual, 3 pages, accessed on or about Jul. 7, 2004.
Totaline, "Wireless Programmable Digital Thermostat," Owner's Manual 474-1100RF, 22 pages, 2000. (Applicant points out, in accordance with MPEP 609.04(a), that the year of publication, 2000, is sufficiently earlier than the effective U.S. filing date, so that the particular month of publication is not in issue.).
Alarm.com, "Alarm.com Cloud Services May Yield Smartest Thermostats on the planet," downloaded from http://www.alarm.com/about/media/MediaGeneric.aspx?cmid=39., 2 pages, printed Apr. 24, 2012.
Alarm.com, "Company Information," 1 page, printed Apr. 24, 2012.
Alarm.com, "Keep it cozy," 1 page, printed Apr. 24, 2012.
Castle, "Ready for Thermostat Wars?" downloaded from http://greentechadvocates.com/2012/03/08/ready-for-thermostat-wars/, 3 pages, Mar. 8, 2012, printed Apr. 27, 2012.
Ditosti, "Alarm.com Cloud Service May Prove to be Smartest Thermostat to Date," downloaded from http://www.alarm.com/about/media/MediaGeneric.aspx?cmid=41, 2 pages, Feb. 29, 2012, printed Apr. 27, 2012.
Edina Realty, "Warranties," 3 pages, prior to 2014.
Filtrete, "Wireless Setup Guide: Thermostat for Windows," EnergyHub Inc., 7 pages, downloaded Feb. 13, 2012.
http://www.energyhub.com/news/earth-networks-and-energyhub-debut-e5-home-energy-d . . . , "Earth Networks and EnergyHub Debut e5 Home Energy Demand Response Program Based on Neighborhood-Level, Real-Time Weather," 2 pages, Jan. 24, 2012, printed Apr. 27, 2012.
http://www.sync-blog.com/sync/2012/01/how-to-control-your-thermostat-from-anywhere- . . . , "How to control your thermostat from anywhere without breaking the bank," Sync(TM) Blog, 2 pages, printed Apr. 27, 2012.
http://www.wi-fi.org/knowledge-center/faqSecurity, "WiFi Protected Setup," 3 pages, downloaded Feb. 13, 2012.
Jacobson, "Xfinity Expands Home Automation with Ecofactor Cloud-Based Enabled Thermostats," downloaded from http://www.cepro.com/article/print/xfinity_expands_home_automation_with_ecofactor_cl . . . 4 pages, Mar. 5, 2012, printed Apr. 27, 2012.

(56) References Cited

OTHER PUBLICATIONS

LaMonica, "Smart thermostat links to cloud for energy savings," downloaded from http://news.cnet.com/8031-11128_3-20086261-54/smart-thermost-links-to-cloud-for-ene . . . , 3 pages, printed Apr. 24, 2012.

Mozer, "The Neural Network House: An Environment that Adapts to its Inhabitants," Department of Computer Science and Institute of Cognitive Science University of Colorado, 5 pages, 1998.

Nexia, "Trane Remote Temperature Monitoring," downloaded from www.nexiahome.com/products.productdetail.aspx?model=043156179510, 2 pages, printed Mar. 25, 2013.

Radio Thermostat, "WiFi Setup Guide for iPhone and iPad," Radio Thermostat Company of America, 6 pages, downloaded Feb. 13, 2012.

Radio Thermostat, "WiFi Setup Guide for Windows XP," Radio Thermostat Company of America, 5 pages, Downloaded Feb. 13, 2012.

St. John, "Smart Grid's Latest Cloud: Honeywell Cloud-Connected Thermostats," downloaded from http://www.greentechmedia.com/articles/read/smart-grids-latest-cloud-honeywells-cloud-c . . . , 7 pages, Nov. 3, 2011, printed Apr. 24, 2012.

Wikipedia, "AOSS," Wikimedia Foundation Inc., downloaded from http://en.wikipedia.org/wiki/AOSS, 2 pages, printed Feb. 13, 2012.

Wikipedia, "SecureEasySetup," Wikimedia Foundation Inc., downloaded from http://en.wikipedia.org/wiki/SecureEasySetup, 1 page, printed Feb. 13, 2012.

Wikipedia, "Wi-Fi Protected Setup," Wikimedia Foundation Inc., downloaded from http://en.wikipedia.org/wiki/Wi-Fi_Protected_Setup, 4 pages, printed Feb. 13, 2012.

Wikipedia, "Windows Rally," Wikimedia Foundation Inc., downloaded from http://en.wikipedia.org/wiki/WindowsConnectNow, 4 pages, printed Feb. 13, 2012.

Xytronix Research & Design, Inc., "X-300 User's Manual, Revision 1.2" 89 pages, Jul. 30, 2009.

Prosecution History from U.S. Appl. No. 13/559,470, dated Mar. 2, 2015 through Jan. 13, 2017, 103 pp.

\* cited by examiner

METHOD OF ASSOCIATING AN HVAC CONTROLLER WITH AN EXTERNAL WEB SERVICE

This is a continuation application of co-pending U.S. patent application Ser. No. 13/559,470, filed on Jul. 26, 2012, and entitled "METHOD OF ASSOCIATING AN HVAC CONTROLLER WITH AN EXTERNAL WEB SERVICE", which is incorporated herein by reference.

CROSS-REFERENCE TO RELATED APPLICATIONS

This application is related to application Ser. No. 13/559,443 entitled "HVAC CONTROLLER WITH WIRELESS NETWORK BASED OCCUPANCY DETECTION AND CONTROL", now U.S. Pat. No. 9,477,239, and application Ser. No. 13/559,489 entitled "HVAC CONTROLLER HAVING A NETWORK-BASED SCHEDULING FEATURE", both filed on the same day herewith and both incorporated herein by reference in their entireties for all purposes.

TECHNICAL FIELD

The present disclosure relates generally to HVAC systems, and more particularly to HVAC controllers that accommodate and/or facilitate control of an HVAC system from a remote location.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. In some cases, it may be desirable for a user to be able to affect the operation of an HVAC system from a remote location relative to the HVAC controller using an external web service.

SUMMARY

The present disclosure pertains generally to HVAC systems, and more particularly to HVAC controllers that accommodate and/or facilitate control of an HVAC system from a remote location relative to the HVAC controller using an external web service. In one illustrative embodiment, an HVAC controller such as a wireless thermostat may be associated with a user account of an external web service. This may be accomplished by, for example, forming a first wireless network between the wireless thermostat and a device separate from the wireless thermostat. In some cases, the first wireless network may be hosted by the wireless thermostat. The device separate from the wireless thermostat may have a user interface. In some cases, the device that is separate from the wireless thermostat may receive one or more access parameters from a user via the user interface. The one or more access parameters may be used by the wireless thermostat to access a second wireless network, such as a WiFi network. For example, the one or more access parameters may include an SSID, a passcode and/or other access parameter(s) for the second wireless network. The second wireless network may be capable of communicating with a wide area network (e.g. via a gateway) for accessing the external web service.

Once the one or more access parameters are received by the user interface of the device, the one or more access parameters may be transmitted from the device to the wireless thermostat via the first wireless network. The wireless thermostat may also transmit one or more registration parameters to the device via the first wireless network. The one or more registration parameters may uniquely identify the wireless thermostat. For example, the one or more registration parameters may include a MAC address and/or a CRC Code. The device may be used to access the external web service and to associate the one or more registration parameters received from the wireless thermostat with the user account of the external web service. In some cases, the one or more registration parameters may be encoded in a hyperlink that, when selected via the user interface of the device, links to the external web service and passes the one or more registration parameters of the wireless thermostat to the external web service.

The wireless thermostat may be connected to the second wireless network using, at least in part, the one or more access parameters, thereby making the wireless thermostat available on the second wireless network and the wide area network via a gateway. Once available on the wide area network, the wireless thermostat may be automatically associated with the particular user account of the external web service.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
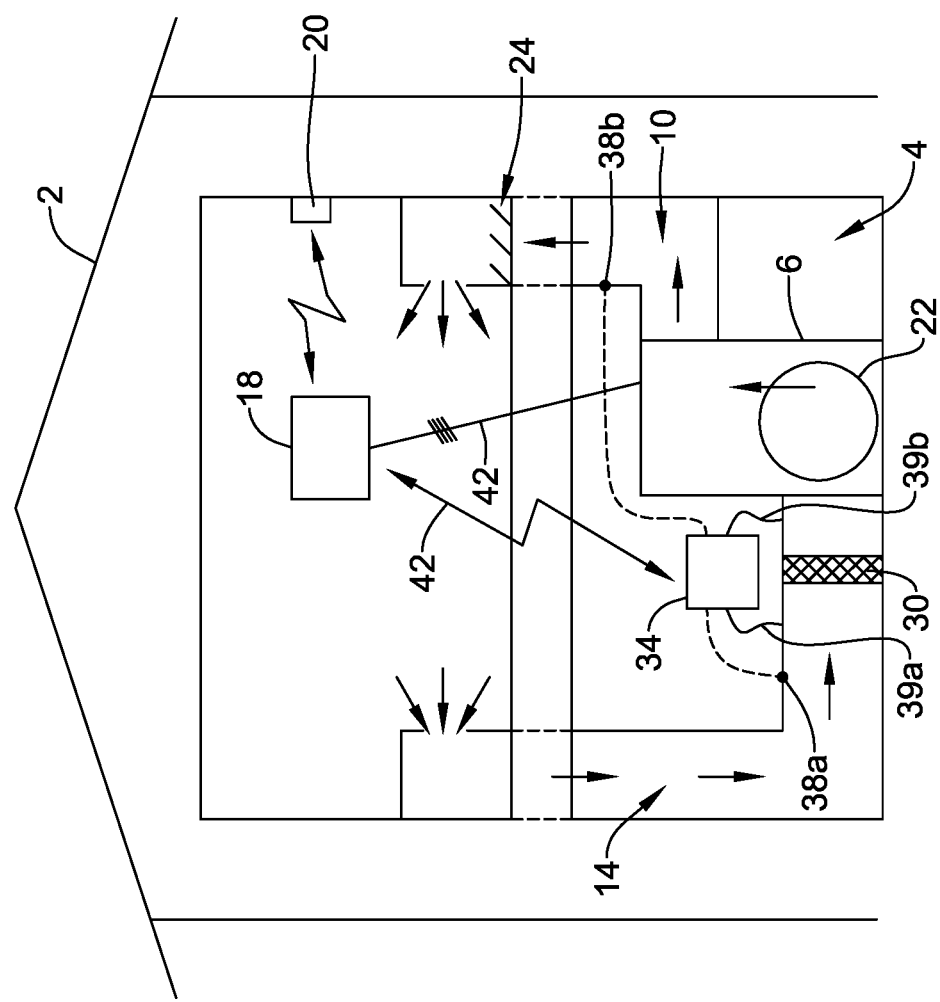
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 20 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.-return air temp.). For the cooling mode, the delta T may be calculated by subtracting the discharge air temperature from the return air temperature (e.g. delta T=return air temp.-discharge air temp.).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
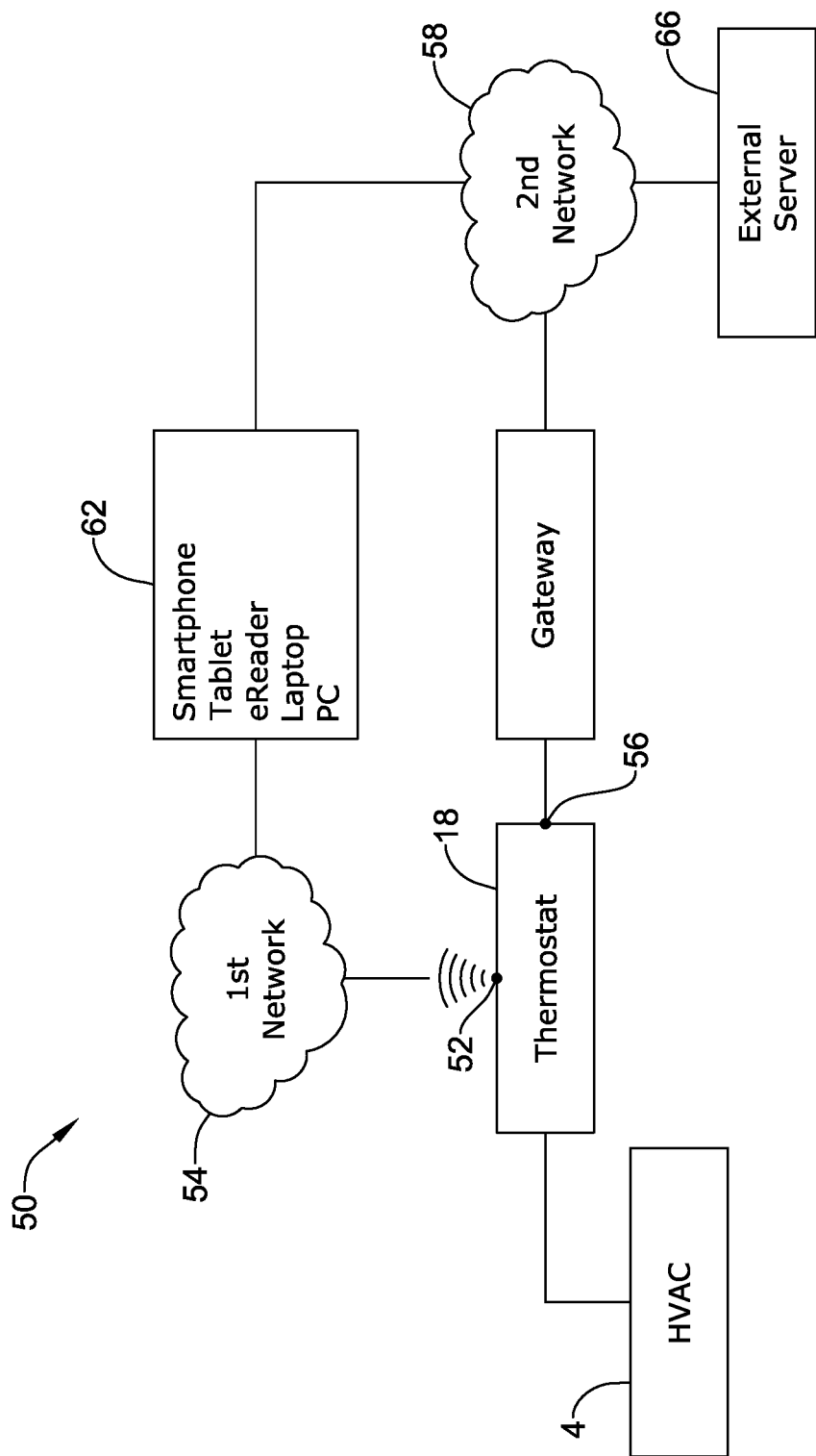
FIG. 2 is a schematic view of an illustrative HVAC control system that may facilitate access and/or control of the HVAC system of FIG. 1.

FIG. 2 is a schematic view of an HVAC control system 50 that facilitates remote access and/or control of the HVAC system 4 shown in FIG. 1. The illustrative HVAC control system 50 includes an HVAC controller, as for example, HVAC controller 18 (see FIG. 1) that is configured to communicate with and control one or more components 6 of the HVAC system 4. As discussed above, the HVAC controller 18 may communicate with the one or more components 6 of the HVAC system 4 via a wired or wireless link. Additionally, the HVAC controller 18 may be adapted to communicate over one or more wired or wireless networks that may accommodate remote access and/or control of the HVAC controller 18 via another device such as a cell phone, tablet, reader, laptop computer, key fob, or the like. As shown in FIG. 2, the HVAC controller 18 may include a first communications port 52 for communicating over a first network 54, and in some cases, a second communications port 56 for communicating over a second network 58. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

Depending upon the application and/or where the HVAC user is located, remote access and/or control of the HVAC controller 18 may be provided over the first network 54 and/or the second network 58. A variety of mobile wireless devices 62 may be used to access and/or control the HVAC controller 18 from a remote location (e.g. remote from HVAC Controller 18) over the first network 54 and/or second network 58 including, but not limited to, mobile phones including smart phones, PDAs, tablet computers, laptop or personal computers, wireless network-enabled key fobs, e-Readers and the like.

In many cases, the mobile wireless devices 62 are configured to communicate wirelessly over the first network 54 and/or second network 58 with the HVAC controller 18 via one or more wireless communication protocols including, but not limited to, cellular communication, ZigBee, RED-LINK™, Bluetooth, WiFi, IrDA, dedicated short range communication (DSRC), EnOcean, and/or any other suitable common or proprietary wireless protocol, as desired.

In some cases, the HVAC controller 18 may be programmed to communicate over the second network 58 with an external web service hosted by one or more external web servers 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like. In some instances, the HVAC controller 18 may be configured to receive one or more user profiles having at least one operational parameter setting that is selected by and reflective of a user's preferences. Additionally, the HVAC controller 18 may be configured to receive local weather data, weather alerts and/or warnings, major stock index ticker data, and/or news headlines over the second network 58. These are just some examples.

Figure 3:
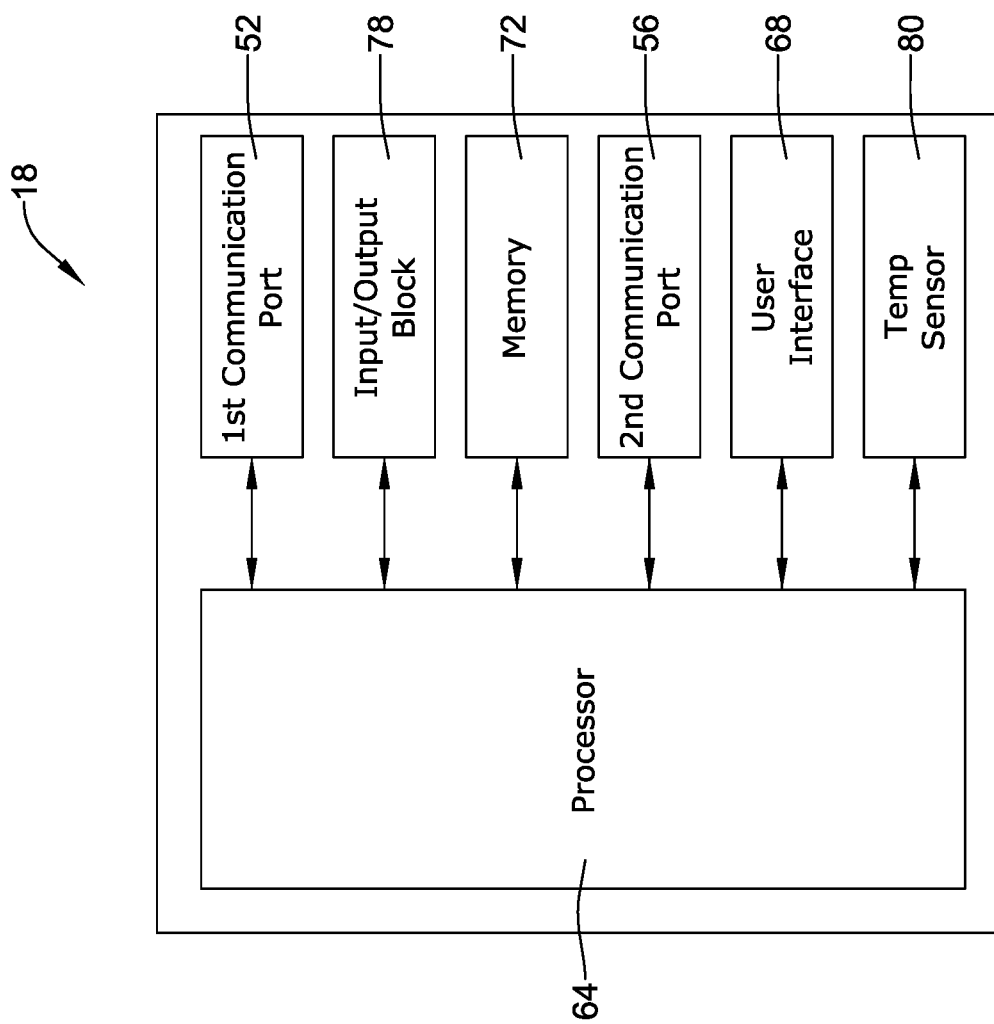
FIG. 3 is a schematic block diagram of an illustrative HVAC controller.

FIG. 3 is a schematic view of an illustrative HVAC controller 18 that may be accessed and/or controlled from a remote location over the first network 54 and/or the second network 58 (FIG. 2) using a mobile wireless device 62 such as, for example, a smart phone, a PDA, a tablet computer, a laptop or personal computer, a wireless network-enabled key fob, an e-Reader, and/or the like. In some instances, the HVAC controller 18 may be a thermostat, but this is not required. As shown in FIGS. 2 and 3, the HVAC controller 18 may include a first communications port 52 for communicating over a first network (e.g. wireless LAN) and a second communications port 56 for communicating over a second network (e.g. WAN or the Internet). The first communications port 52 can be a wireless communications port including a wireless transceiver for wirelessly sending and/or receiving signals over a first wireless network 54. Similarly, the second communications port 56 may be a wireless communications port including a wireless transceiver for sending and/or receiving signals over a second wireless network 58. In some cases, the second communications port 56 may be in communication with a wired or wireless router or gateway for connecting to the second network, but this is not required. In some cases, the router or gateway may be integral to the HVAC controller 18 or may be provided as a separate device. Additionally, the illustrative HVAC controller 18 may include a processor (e.g. microprocessor, microcontroller, etc.) 64 and a memory 72. The HVAC controller 18 may also include a user interface 68, but this is not required.

In some cases, HVAC controller 18 may include a timer (not shown). The timer may be integral to the processor 64 or may be provided as a separate component. The HVAC controller 18 may also optionally include an input/output block (I/O block) 78 for receiving one or more signals from the HVAC system 4 and/or for providing one or more control signals to the HVAC system 4. For example, the I/O block 78 may communicate with one or more HVAC components 6 of the HVAC system 4. Alternatively, or in addition to, the I/O block 78 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device.

The HVAC controller 18 may also include an internal temperature sensor 80, but this is not required. In some cases, the HVAC controller 18 may communicate with one or more remote temperature sensors, humidity sensors, and/or occupancy sensors located throughout the building or structure. The HVAC controller may communicate with a temperature sensor and/or humidity sensor located outside of the building or structure for sensing an outdoor temperature and/or humidity if desired.

The processor 64 may operate in accordance with an algorithm that controls or at least partially controls one or more HVAC components of an HVAC system such as, for example, HVAC system 4 shown in FIG. 1. The processor 64, for example, may operate in accordance with a control algorithm that provides temperature set point changes, humidity set point changes, schedule changes, start and end time changes, window frost protection setting changes, operating mode changes, and/or the like. At least a portion of the control algorithm may be stored locally in the memory 72 of the HVAC controller 18 and, in some cases, may be received from an external web service over the second network. The control algorithm (or portion thereof) stored locally in the memory 72 of the HVAC controller 18 may be periodically updated in accordance with a predetermined schedule (e.g. once every 24 hours, 48 hours, 72 hours, weekly, monthly, etc.), updated in response to any changes to the control algorithm made by a user, and/or updated in response to a user's request. The updates to the control algorithm or portion of the control algorithm stored in the memory 72 may be received from an external web service over the second network. In some cases, the control algorithm may include settings such as set points.

In some cases, the processor 64 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure in which the HVAC system 4 is located may be unoccupied for an extended period of time. In other cases, the third operating mode may correspond to a sleep mode wherein the building occupants are either asleep or inactive for a period of time. These are just some examples. It will be understood that the processor 64 may be capable of operating in additional modes as necessary or desired. The number of operating modes and the operating parameter settings associated with each of the operating modes may be established locally through a user interface, and/or through an external web service and delivered to the HVAC controller via the second network 58 where they may be stored in the memory 72 for reference by the processor 64.

In some cases, the processor 64 may operate according to one or more predetermined operating parameter settings associated with a user profile for an individual user. The user profile may be stored in the memory 72 of the HVAC controller 18 and/or may be hosted by an external web service and stored on an external web server. The user profile may include one or more user-selected settings for one or more operating modes that may be designated by the user. For example, the processor 64 may operate according to a first operating mode having a first temperature set point associated with a first user profile, a second operating mode having a second temperature set point associated with the first user profile, a third operating mode having a third temperature set point associated with the first user profile, and/or the like. In some cases, the first operating mode may correspond to an occupied mode, the second operating mode may correspond to an unoccupied mode, and the third operating mode may correspond to a vacation or extended away mode wherein the building or structure in which the HVAC system 4 is located may be unoccupied for an extended period of time. In some cases, multiple user profiles may be associated with the HVAC controller 18. In certain cases where two or more user profiles are associated with the HVAC controller 18, the processor 64 may be programmed to include a set of rules for determining which individual user profile takes precedence for controlling the HVAC system when both user profiles are active.

In the illustrative embodiment of FIG. 3, the user interface 68, when provided, may be any suitable user interface that permits the HVAC controller 18 to display and/or solicit information, as well as accept one or more user interactions with the HVAC controller 18. For example, the user interface 68 may permit a user to locally enter data such as temperature set points, humidity set points, starting times, ending times, schedule times, diagnostic limits, responses to alerts, and the like. In one embodiment, the user interface 68 may be a physical user interface that is accessible at the HVAC controller 18, and may include a display and/or a distinct keypad. The display may be any suitable display. In some instances, a display may include or may be a liquid crystal display (LCD), and in some cases a fixed segment display or a dot matrix LCD display. In other cases, the user interface 68 may be a touch screen LCD panel that functions as both display and keypad. The touch screen LCD panel may be adapted to solicit values for a number of operating parameters and/or to receive such values, but this is not required. In still other cases, the user interface 68 may be a dynamic graphical user interface.

In some instances, the user interface 68 need not be physically accessible to a user at the HVAC controller 18. Instead, the user interface 68 may be a virtual user interface 68 that is accessible via the first network 54 and/or second network 58 using a mobile wireless device such as one of those devices 62 previously described herein. In some cases, the virtual user interface 68 may include one or more web pages that are broadcasted over the first network 54 (e.g. LAN) by an internal web server implemented by the processor 64. When so provided, the virtual user interface 68 may be accessed over the first network 54 using a mobile wireless device 62 such as any one of those listed above. Through the one or more web pages, the processor 64 may be configured to display information relevant to the current operating status of the HVAC system 4 including the current operating mode, temperature set point, actual temperature within the building, outside temperature, outside humidity and/or the like. Additionally, the processor 64 may be configured to receive and accept any user inputs entered via the virtual user interface 68 including temperature set points, humidity set points, starting times, ending times, schedule times, window frost protection settings, diagnostic limits, responses to alerts, and the like.

In other cases, the virtual user interface 68 may include one or more web pages that are broadcasted over the second network 58 (e.g. WAN or the Internet) by an external web server (e.g. web server 66). The one or more web pages forming the virtual user interface 68 may be hosted by an external web service and associated with a user account having one or more user profiles. The external web server 66 may receive and accept any user inputs entered via the virtual user interface and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server may update the control algorithm, as applicable, and transmit at least a portion of the updated control algorithm over the second network 58 to the HVAC controller 18 where it is received via the second port 56 and may be stored in the memory 72 for execution by the processor 64.

The memory 72 of the illustrative HVAC controller 18 may be in communication with the processor 64. The memory 72 may be used to store any desired information, such as the aforementioned control algorithm, set points, schedule times, diagnostic limits such as, for example, differential pressure limits, delta T limits, and the like. The memory 72 may be any suitable type of storage device including, but not limited to, RAM, ROM, EPROM, flash memory, a hard drive, and/or the like. In some cases, the processor 64 may store information within the memory 72, and may subsequently retrieve the stored information from the memory 72.

Referring back generally to FIG. 2, any number or wired or wireless devices, including the HVAC controller 18 and a user's mobile wireless device 62, may be connected to and enrolled in a building's wireless local area network 54. In some cases, the HVAC controller 18 may be configured to execute a program code stored in the memory 72 for connecting to and enrolling with the wireless local area network 54 of the building in which it is located. Each device may be assigned a unique identifier (e.g. IP address) upon enrollment with the wireless local area network. The unique identifier may be assigned by a router or other gateway device. The router or gateway device may store a local cache containing a list of unique identifiers (e.g. IP addresses) for each of the devices connected to the wireless local area network. The router or gateway can be a separate device from the HVAC controller 18, but this is not required. In some cases, a MAC address or MAC CRC address provided by the device being enrolled in the wireless local area network host upon connection of the device to the network may be used to uniquely identify the device on the wireless local area network 54 and/or wireless network 58. The unique identifier may be used to identify and recognize each device on the network 54 each time the device is connected to the wireless local area network 54 and/or wireless network 58.

Figure 4:
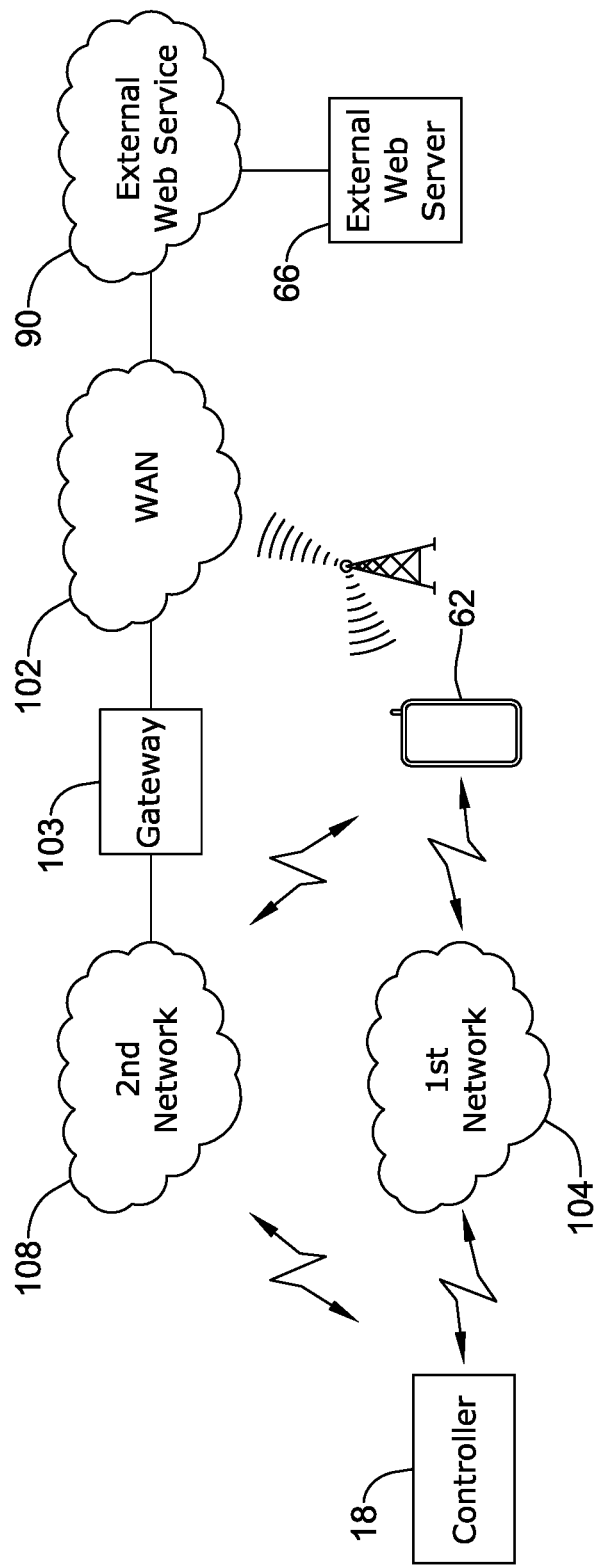
FIG. 4 is a schematic diagram of an HVAC controller in communication with a remote wireless device and an external web service.

FIG. 4 is a schematic diagram of an HVAC controller 18 in communication with a remote wireless device 62 and an external web service 90 hosted by an external web server 66 through a wide area network 102. In some cases, the HVAC controller 18 may be programmed to configure itself as a wireless access point for hosting its own wireless network upon initial installation of the HVAC controller 18 within a building or structure, and may be programmed to accept a wireless connection with a remote wireless device 62. The remote wireless device 62 may be any one of the wireless devices described herein. In some cases, the remote wireless device 62 may be programmed to execute an application code that may cause the wireless device 62 to search for available wireless networks within and/or in close proximity to the building or structure in which the HVAC controller 18 is located. Since the HVAC controller 18 may be initially configured as a wireless access point, the application code may cause the wireless device 62 to detect the wireless network hosted at the HVAC controller 18, and to display the HVAC controller's wireless network on the user interface of the wireless device 62 as being available for connection. The HVAC controller's wireless network may be displayed as one selectable option among a list of other wireless networks available for connection. A user may initiate connection to the HVAC controller's wireless network by selecting of the HVAC controller's wireless network from the list of wireless network's available for connection displayed on the user interface of the remote wireless device 62.

A first wireless network 104 may be established between the HVAC controller 18 and a wireless device 62 upon acceptance of the connection from the remote wireless device 62. Additionally, the HVAC controller 18 may be configured to connect to a second wireless network 108. In some cases, the first wireless network 104 and the second wireless network 108 are both WiFi wireless networks. In other cases, the first wireless network 104 may be a blue tooth wireless network and the second wireless network 108 may be a WiFi wireless network. In still other cases, the first wireless network 104 may be a ZigBee wireless network and the second wireless network 108 may be a WiFi wireless network. These are just some examples. It is contemplated that the first network 104 and the second network 108 may be any suitable network, as desired.

In many cases, the second wireless network 108 may be capable of communicating over a wide area network 102 via a router or gateway 103 for accessing an external web service 90 hosted by an external web server 66. The external web service 90 may include a user account having one or more user profiles that may be associated with the HVAC controller 18. The external web service 90 may provide additional functionalities and or programming capabilities that may not otherwise be available at the HVAC controller 18, or through the user interface of the remote device 62. Additionally, the external web service may be programmed to receive selected data from the HVAC controller 18 over the wide area network 102 via the second wireless network 108 and/or WAN 102. When provided, the data received from the HVAC controller 18 may be analyzed to determine a user's energy usage trends, determine a performance of the HVAC system, detect and/or predict occupancy of the building, and/or perform any other suitable analysis as desired.

In some cases, the HVAC controller 18 may be programmed to receive one or more access parameters for accessing the second wireless network 108 over the first wireless network 104 from the user's wireless device 62. In some cases, the second wireless network 108 may be a wireless local area network of the building or structure in which the HVAC controller 18 is installed. The one or more access parameters may include a service set identifier (SSID) for the second wireless network 108 and/or passcode required to gain access to the second wireless network 108. In some cases, the one or more access parameters for accessing the second wireless network 108 may have been previously entered by a user through the user interface of the user's wireless device 62, and may be stored in the memory of the wireless device 62. For example, in some cases, the user's wireless device 62 may be configured to execute an application program (e.g. app) that solicits and accepts via the user interface of the device 62 one or more access parameters for accessing the second wireless network 108. The application program may be provided by and downloaded from the external web service 90 for this purpose, but this is not required. This may be performed by a user when connecting their wireless device 62 to the building's wireless local area network (second wireless network 108). As such, the user's wireless device 62 may already store the one or more access parameters for the second wireless network 108, which may then be passed to the HVAC controller 18 when the wireless device 62 is connected to the HVAC controller 18 via the first wireless network 104.

In some cases, upon connection of the wireless device 62 to the HVAC controller 18 via the first wireless network 104, the HVAC controller 18 may be configured to implement a web server for serving up one or more web pages over the first wireless network 104 that may be displayed and viewed on the user interface of the wireless device 62. The one or more web pages displayed on the user interface of the wireless device 62 may solicit and accept the one or more access parameters for accessing the second wireless network 108 from a user.

Once the one or more access parameters are provided to the HVAC controller 18 via the first wireless network 104, the HVAC controller 18 may be programmed to use, at least in part, the one or more access parameters to connect to the second wireless network 108. In some cases, the HVAC controller 18 may be programmed to connect to the second wireless network 108 as a network client device using the one or more access parameters received from the user's wireless device 62, making the HVAC controller 18 available on the second network 108. In some cases, the HVAC controller 18 may be programmed to first disconnect itself from the first wireless network 104 established between the HVAC controller 18 and the user's wireless device 62 before connecting to the second wireless network 108 as a network client. For example, and in some cases, the HVAC controller 18 may be programmed to perform a reset, and on initialization, may automatically connect to the second wireless network 108 using the one or more access parameters.

In some cases, before connecting to the second network 108, the HVAC controller 18 may be further programmed to transmit one or more registration parameters over the first wireless network 104 to the user's wireless device 62. The one or more registration parameters may be stored in the memory 72 of the HVAC controller 18 and may be used to uniquely identify the HVAC controller 18 to the external web service 90. In some cases, the one or more registration parameters are pre-loaded into the memory 72 of the HVAC controller at the factory. The one or more registration parameters may include, for example, a Media Access Control address (MAC address) and/or cyclic redundancy check code (CRC code) of the HVAC controller 18. These are just examples. The one or more registration parameters may be received by the user's wireless device 62 and stored in the device memory for later use. In some cases, the one or more registration parameters may be embedded or encoded in a hyperlink that may be delivered from the HVAC controller 18 to the user's wireless device 62 over the first network 104. The hyperlink may be provided on a web page served up by the HVAC controller on the first network 104 and that is viewable on the user interface of the user's wireless device 62. The hyperlink may be available for selection by a user through the user interface of the wireless device 62 such that the hyperlink, when selected by a user, may link to the external web service 90. In response, the external web service 90 may display a web page on the user interface of the wireless device 62 prompting the user to enter a user login and password to gain access to a user account hosted by the external web service 90. Upon successful login in to the user account, the external web service 90 may associate the one or more registration parameters received from the wireless device 62 with the user account.

Rather than embedding the one or more registration parameters in a hyperlink, in some cases, the user's wireless device 62 may be programmed to automatically receives the one or more registration parameters from the HVAC controller 18 when the wireless device 62 is connected to the HVAC controller 18, and to provide the one or more registration parameters to the external web service 90. In some cases, this functionality may be provided by an application program (e.g. app) that is downloaded from the external web service 90 for this purpose, but this is not required. In other cases, the application program may be available for download from another web service such as, for example, Apple's iTunes or Google's App Store. In any event, upon login to a user account of the external web service 90, the application program may automatically transmit the one or more registration parameters to the external web service 90. In some cases, the external web service 90 may use the one or more registration parameters to associate a particular HVAC controller with a particular user's account, and in some cases, may be used to differentiate between two or more HVAC controllers that are associated with a single user account.

In some cases, the wireless device 62 may be further programmed to provide a geographical location of the HVAC controller 18 to the external web service 90. In one example, the same application program that causes the wireless device 62 to transmit the one or more registration parameters that uniquely identify the HVAC controller 18 to the external web service 90 may also cause the wireless device 62 to transmit geographical location information identifying the geographical location of the HVAC controller to the external web service 90. When so provided, the external web service 90 may receive the location data associated HVAC controller 18 and associate the location data with the user's account. In some cases, it may be possible to have two HVAC controllers located in two different geographical locations (e.g. home and cabin) associated with a single user account. The external web service 90 may be configured to differentiate between the two or more HVAC controllers 18 associated with a single user account through the one or more registration parameters and the geographical location associated with each of the different thermostats.

Figure 5:
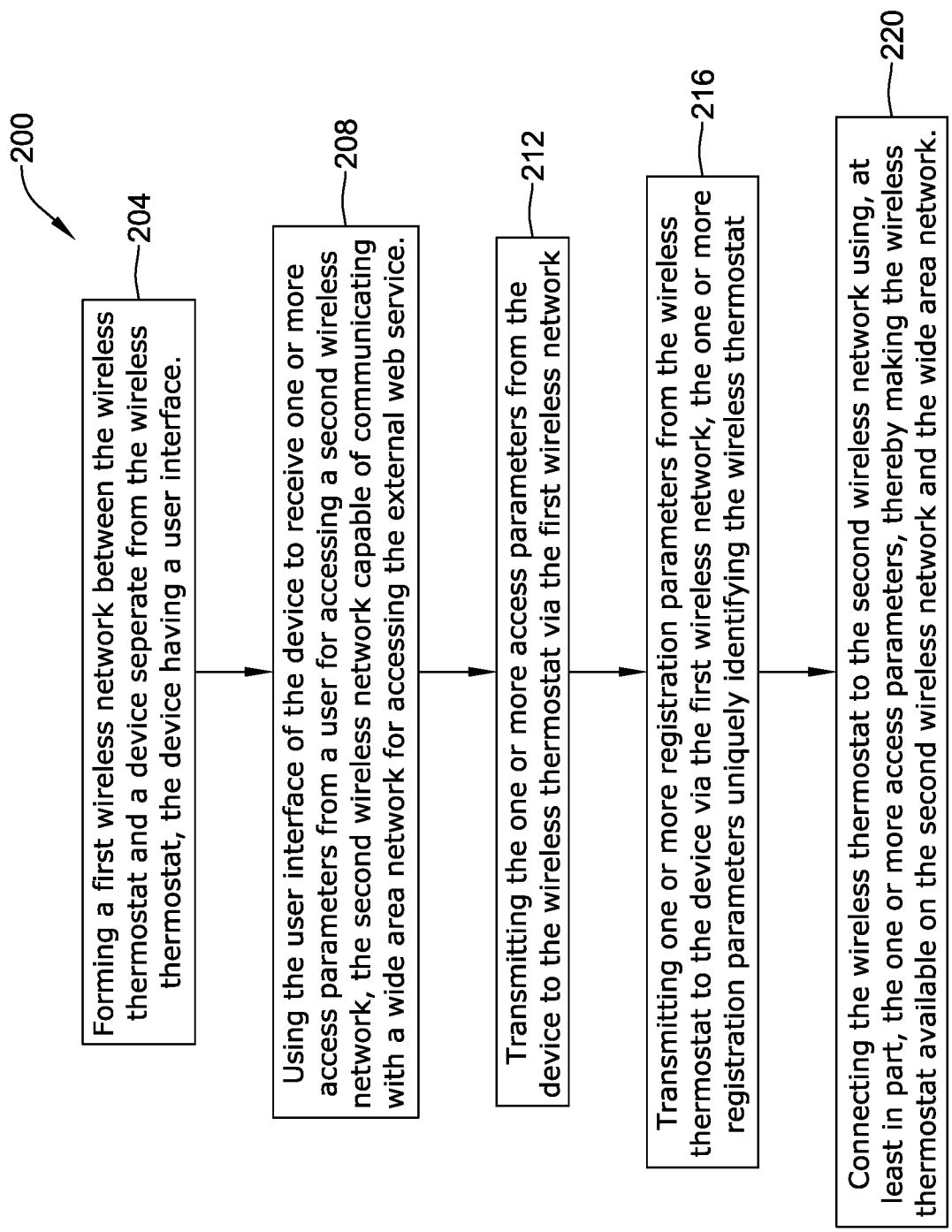
FIG. 5 is a flow chart of a method of associating an HVAC controller with an external web service.
Figure 6:
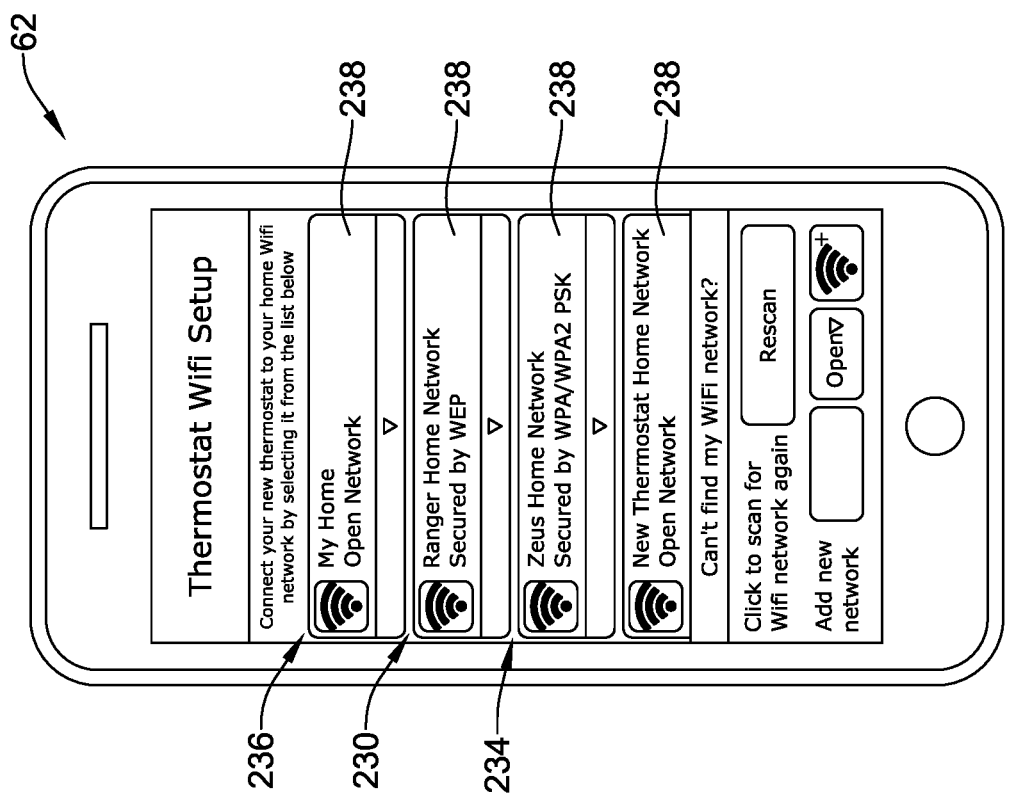
FIGS. 6-9 show illustrative screens that may be displayed on the user interface of a wireless device when associating an HVAC controller with an external web service.

FIG. 5 is a flow chart of a method 200 of associating an HVAC controller 18 with a user account hosted by an external web service. FIGS. 6-9 provide exemplary screens that may be displayed on the user interface of a user's device 62 such as, for example, a user's smartphone (e.g. iPhone™) when connecting the HVAC controller 18 to the building's wireless network and associating the HVAC controller 18 with a user's account hosted by the external web service 90. While FIGS. 6-9 show exemplary screens that may be displayed on a user's smart phone, it should be understood that a similar set of screens may be displayed on any remote device having a user interface that may be used to enroll and connect the HVAC controller 18 to a local area network such as, for example, a tablet computer, a personal computer, and/or lap top computer that may be configured for wireless communication over one or more networks. Additionally, in some cases, it may be assumed that the user's smart phone or other remote wireless device 62 is already configured to be connected to and enrolled in the building's local area network prior to carrying out the method generally outlined in FIG. 5 and shown in the illustrative screens of FIGS. 6-9.

In some embodiments, the method includes establishing a first wireless network 104 between the HVAC controller 18 and a wireless device 62 (Block 204). The wireless device 62 may be any of the wireless devices as described herein and may include a user interface capable of accepting user interactions from a user. In some cases, the wireless device 62 may be configured to execute an application program (e.g. app) or other programming that enables the wireless device 62 to scan for available wireless networks that are available for connection, including the wireless network available at the HVAC controller 18. In some cases, an application program may cause the wireless device to display a screen 230 on the user interface 234 of the wireless device 62 that displays a list 236 of wireless networks 238 available for connection, as shown in the illustrative example shown in FIG. 6. In some cases, the list 236 of wireless networks 238 may be generated by the HVAC controller 18 and displayed on the user interface 234 of the wireless device. Each of the networks 238 displayed on the screen 230 may be displayed as individually selectable options available for selection by a user, and in the example shown, are assigned a unique SSID that identifies them to a user. For example, the HVAC controller's may provide an access point wireless network identified as "New Thermostat", "Honeywell Thermostat", or just simply "Wireless Thermostat". The wireless device 62 will attempt to connect to the HVAC controller's wireless network upon selection of the wireless network option 238 labeled "New Thermostat Home Network".

Figure 7:
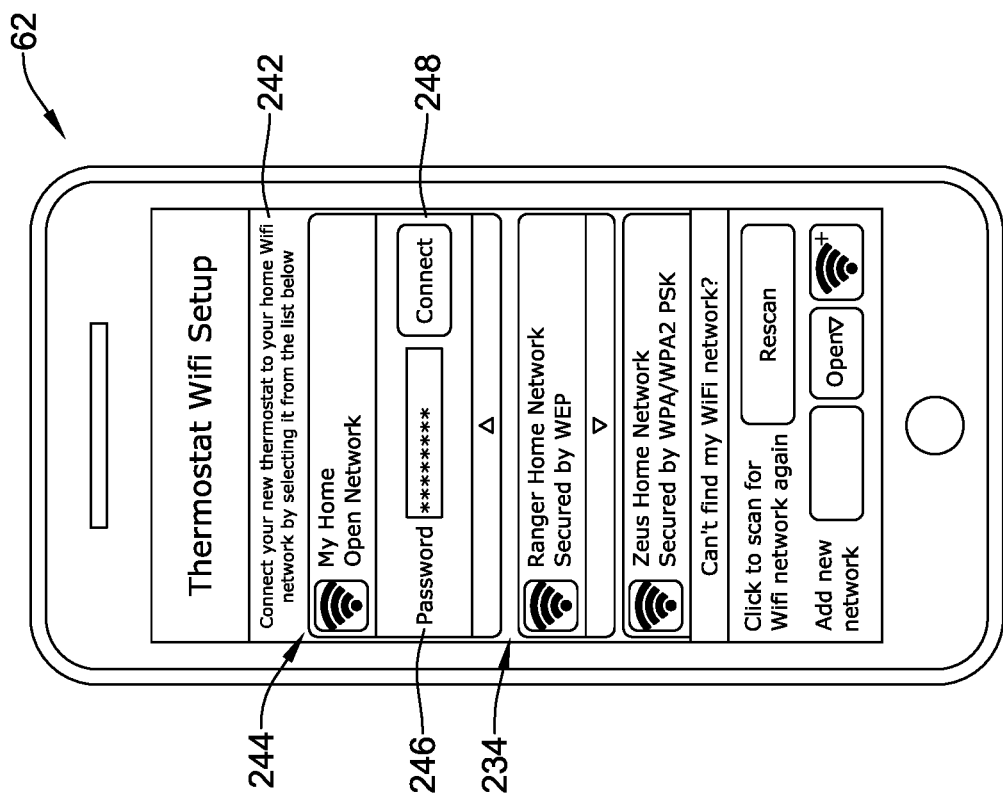

Upon successful connection of the wireless device 62 to the HVAC controller's wireless network, establishing a first wireless network 104 between the wireless device 62 and the HVAC controller 18, the HVAC controller 18 may serve up at least one web page over the first wireless network that may be displayed on the user interface 234 of the wireless device 62 for soliciting information from a user for accessing a second wireless network 108 that may be capable of communicating over a wide area network with an external web service (Block 208). For example, the HVAC controller 18 may serve up a web page 242 over the first wireless network 104 that is displayed on the user interface 234 of the wireless device 62 that may prompt a user to connect to the building's wireless local area network 108. As shown in FIG. 7, the web page 242 may include a user prompt 244 that may prompt a user to take a specific action such as connecting to the building's wireless local area network 108. Additionally, the web page may include a password prompt 246 that may prompt the user to enter a password or passcode associated with the building's wireless local area network 108. Upon entry of the password and selection of the connect button 248 displayed on the web page 242, the wireless device 62 may transmit the SSID and/or password associated with the building's wireless network 108 to the HVAC controller 18 over the first wireless network 104 (Block 212). The wireless device may be programmed to encrypt the SSID and/or password provided by the user before transmitting the SSID and/or password to the HVAC controller 18. The HVAC controller 18 may receive the SSID and/or password associated with the building's wireless network (second wireless network 108) and may use this information, at least in part, to connect to the building's wireless network 108 thereby making the HVAC controller 18 available on the building's wireless network 108 (Block 220 of FIG. 5). In some cases, the HVAC controller 18 may be programmed to decrypt the SSID and/or password, if applicable. Encrypting the SSID and/or password prior to delivery to the HVAC controller 18 over the network protects the building's network credentials. In some cases, because the building's wireless network 108 is capable of communicating over a wide area network with an external web service 90, the HVAC controller 18 may also be available over the wide area network 102 (e.g. via gateway 103).

Figure 8:
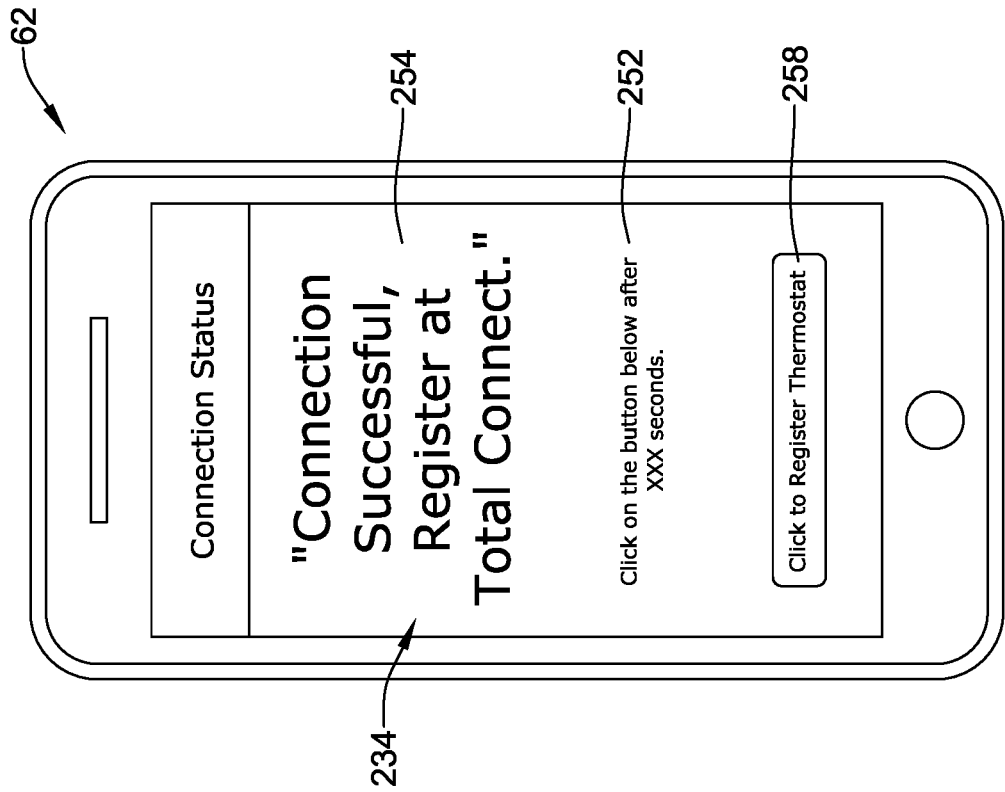

In some cases, the method 200 may include transmitting one or more registration parameters from the HVAC controller 18 to the wireless device 62 over the first wireless network 104 (Block 216 of FIG. 5). The one or more registration parameters may uniquely identify the HVAC controller 18, and, in some cases, may include a MAC address and/or CRC code of the HVAC controller 18. In one case, for example, upon successful connection of the HVAC controller 18 with the wireless device 62 (either via the first wireless network 104 or the second wireless network 108), the HVAC controller may serve up an additional web page 252 that is displayed on the user interface 234 of the wireless device 62, such as in the illustrative example shown in FIG. 8. The additional web page 252 may include a user message 254 that may prompt the user to confirm success of the connection to the building's wireless local area network and that may instruct the user to take a required action. For example, as shown in FIG. 8, the user message 254 states "Connection successful? Register at Total Connect."

In this example, the user message prompts the user to view the user interface of the HVAC controller to visually verify that the HVAC controller 18 has been successfully connected to the building's wireless local area network 108. Additionally, the user message instructs the user to register the HVAC controller 18 with external web service 90 (e.g. Honeywell's TOTAL CONNECT™ web service) if the connection was successful by selecting button or link 258 displayed on the user interface 234 that, upon selection by a user, links to the external web service 90. In some cases, the one or more registration parameters that uniquely identify the HVAC controller 18 may be embedded within the button or link 258. Upon selection of the button or link 258, the one or more registration parameters may be automatically transmitted to the external web service 90 where they may be associated with the user's account hosted by the external web service 90. A second button for or link 260 may be provided for selection by the user if connection of the HVAC controller 18 to the network 108 was not confirmed or the attempt failed. The button or link 260, upon selection by the user, may cause the controller to re-attempt to connect to the network 108.

Figure 9:
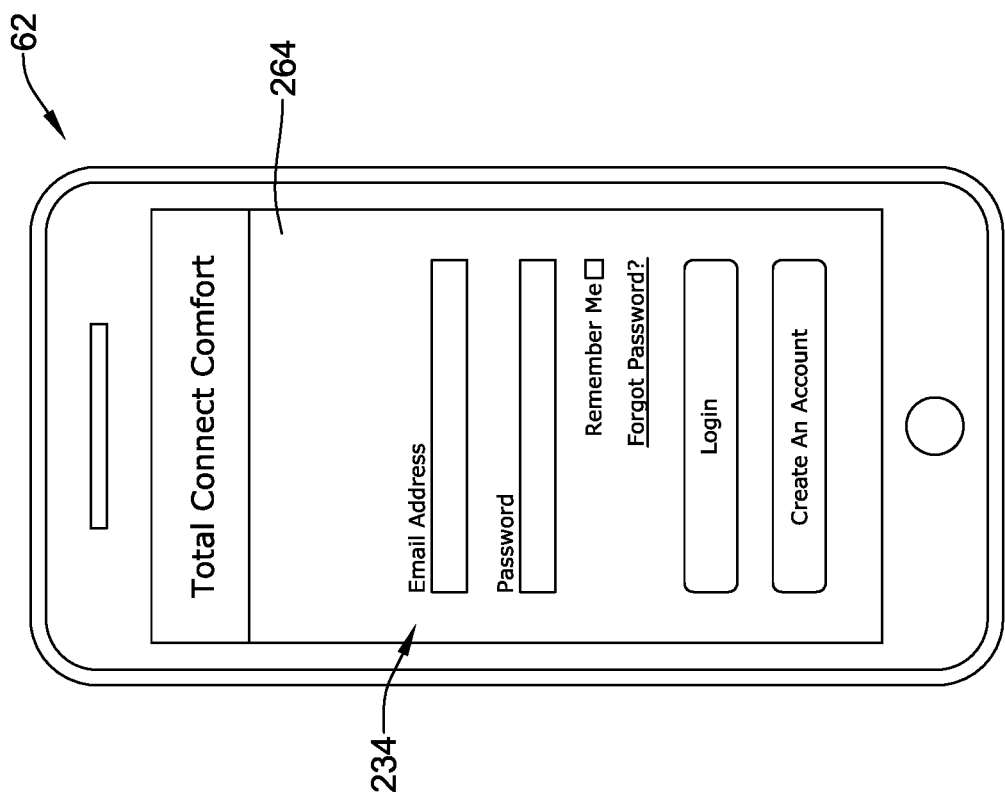

The wireless device 62 may connect to the external web service 90 over the wide area network 102 via the building's wireless network 108 or, in some cases, may connect directly to the web service over the wide area network 102. Upon connection to the external web service 90 over the wide area network 102, the wireless device 62 may display one or more web pages served up by the external web service over the wide area network 102 on the user interface 234 of the wireless device 62. FIG. 9 provides an illustrative example of a web page 264 that may be displayed on the user interface 234 of the wireless device 62 upon selection of the link or button 258 and connection to an external web service 90. In one example, the web page 264 may prompt the user to access a user account by entering a user identification (user id) and password. In another example, the web page 264 may prompt the user to create a user account on the external web service 90. Upon successful login to a new or an existing user account, the external web service 90 may receive the one or more registration parameters from the wireless device 62 for uniquely identifying the HVAC controller 18 and associate the one or more registration parameters identifying the HVAC controller 18 with the user account. Additionally, the external web service 90 may continue to serve up additional web pages that may be displayed on the user interface 234 of the wireless device 62 for facilitating access and/or control of the HVAC controller 18.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A method of associating a wireless building controller with a user account of an external web service, the method comprising:
    forming a first wireless network between the wireless building controller and a device separate from the wireless building controller, the device having a user interface;
    receiving, with the user interface of the device and from a user, one or more access parameters for accessing a second wireless network, the second wireless network capable of communicating with a wide area network for accessing the external web service;
    in response to receiving the one or more access parameters, transmitting the one or more access parameters from the device to the wireless building controller via the first wireless network, wherein the one or more access parameters include a passcode for the second wireless network;
    disconnecting, by the wireless building controller, the first wireless connection formed between the wireless building controller and the device;
    establishing, after disconnecting the first wireless connection formed between the wireless building controller and the device, a connection from the wireless building controller to the second wireless network using, at least in part, the one or more access parameters, thereby making the wireless building controller available on the second wireless network and the wide area network, wherein establishing the connection comprises establishing the connection from the wireless building controller to the second wireless network using the passcode;
    associating one or more registration parameters of the wireless building controller with the user account of the external web service, the one or more registration parameters uniquely identifying the wireless building controller; and
    accessing the external web service by the wireless building controller via the second wireless network and the wide area network.

2. The method of claim 1, wherein the device is a wireless device.

3. The method of claim 2, wherein the wireless device is a lap top computer, a tablet computing device, or a smart phone.

4. The method of claim 1, wherein the one or more registration parameters are loaded into the wireless building controller at the factory.

5. The method of claim 1, wherein the first wireless network and the second wireless network are both WiFi wireless networks.

6. The method of claim 1, wherein the first wireless network is a blue tooth wireless network, and the second wireless network is a WiFi wireless network.

7. The method of claim 1, wherein the first wireless network is a Zigbee wireless network, and the second wireless network is a WiFi wireless network.

8. The method of claim 1, wherein the second wireless network includes an access point that provides communication between the second wireless network and the wide area network.

9. The method of claim 1, wherein the one or more access parameters include a Service Set IDentifier (SSID) of the second wireless network: and
    wherein establishing the connection comprises establishing the connection from the wireless building controller to the second wireless network using the SSID of the second wireless network.

10. The method of claim 1, wherein the one or more registration parameters include a Media Access Control address (MAC ADDRESS) and/or a Cyclic Redundancy Check (CRC) code of the wireless building controller.

11. The method of claim 1, wherein the one or more registration parameters are encoded in a hyperlink that, when selected, links to the external web service.

12. The method of claim 1, further comprising performing a reset on the wireless building controller before connecting the wireless building controller to the second wireless network.

13. The method of claim 1, wherein the wireless building controller provides further comprising:
    providing, by the wireless building controller, a web-page to the device across the first wireless network, wherein the web-page is configured to accept accepts the one or more access parameters from the user via the user interface of the device.

14. The method of claim 1, wherein the device executes further comprising: executing, by the device, an application program, wherein the application program is configured to accept accepts the one or more access parameters from the user via the user interface of the device.

15. A method of connecting a wireless building controller to a local area network of a building, the method comprising:
    forming a wireless connection between the wireless building controller and a device separate from the wireless building controller, the device having a user interface;
    receiving, with the user interface of the device and from a user, one or more access parameters for accessing the local area network of the building, wherein the one or more access parameters include a passcode for the local area network of the building;
    in response to receiving the one or more access parameters, transmitting the one or more access parameters from the device to the wireless building controller via the wireless connection between the wireless building controller and the device; disconnecting the wireless connection formed between the wireless building controller and the device; and
    establishing, after disconnecting the wireless connection formed between the wireless building controller and the device, a connection from the wireless building controller to the local area network of the building using, at least in part, the one or more access parameters, wherein establishing the connection comprises establishing the connection from the wireless building controller to the local area network using the passcode.

16. A wireless building controller configured to communicate with and control one or more HVAC components of a building, the wireless building controller comprising: a temperature sensor; a memory;
a controller, the controller configured to:
accept a wireless connection with a remote wireless device; receive one or more access parameters associated with a local area network from the remote wireless device via the wireless connection, wherein the one or more access parameters include a passcode for the local area network; disconnect the wireless connection with the remote wireless device;
establish, after disconnecting the wireless connection with the remote wireless device, a connection to the local area network as a client device using the one or more access parameters received from the remote wireless device, wherein, to establish the connection, the controller is configured to establish the connection from the wireless building controller to the local area network using the passcode; and
communicate with an external web service at least in part through the local area network, wherein the wireless building controller is identified to the external web service by the one or more registration parameters that uniquely identifying the wireless building controller.

17. A computer readable medium having stored thereon in a non-transitory state a program code for use by a wireless device having a user interface, the program code causing the wireless device to:
connect the wireless device to a wireless network hosted by a wireless building controller;
receive via the user interface of the wireless device one or more access parameters associated with a local area network, wherein the one or more access parameters include a passcode for the local area network; and
transmit the one or more access parameters from the wireless device to the wireless building controller via the wireless network hosted by the wireless building controller, wherein the wireless building controller is configured to disconnect the wireless network hosted by the wireless building controller and establish, after disconnecting the wireless network hosted by the wireless building controller, a connection to the local area network using at least the passcode of the one or more access parameters to gain access to the local area network.

* * * * *